US 12,440,543 B2

(12) United States Patent
Tsau et al.

(10) Patent No.: US 12,440,543 B2
(45) Date of Patent: Oct. 14, 2025

(54) BOTULINUM TOXIN TYPE A COMPLEX, AND FORMULATION THEREOF AND USAGE METHOD THEREFOR

(71) Applicant: OBIGEN PHARMA, INC., Zhubei (TW)

(72) Inventors: Tzu-Wen Tsau, Taipei (TW); Yung-Kai Wang, Taipei (TW); Kuan-Cheng Shen, Taipei (TW); Yueh-Chin Wu, Taipei (TW); Cheng-Der Tony Yu, Taipei (TW); Yu-Chun Tseng, Taipei (TW)

(73) Assignee: OBIGEN PHARMA, INC., Zhubei (CN)

(*) Notice: Subject to any disclaimer, the term of this patent is extended or adjusted under 35 U.S.C. 154(b) by 208 days.

(21) Appl. No.: 17/623,072

(22) PCT Filed: Mar. 31, 2020

(86) PCT No.: PCT/CN2020/082450
§ 371 (c)(1),
(2) Date: Dec. 27, 2021

(87) PCT Pub. No.: WO2021/195968
PCT Pub. Date: Oct. 7, 2021

(65) Prior Publication Data
US 2022/0257730 A1    Aug. 18, 2022

(51) Int. Cl.
*A61K 38/48*    (2006.01)
*A61K 8/66*    (2006.01)
(Continued)

(52) U.S. Cl.
CPC .......... *A61K 38/4893* (2013.01); *A61K 8/66* (2013.01); *A61K 9/0019* (2013.01); *A61K 9/19* (2013.01);
(Continued)

(58) Field of Classification Search
CPC ...... A61K 38/4893; C07K 14/33; C12N 9/52; C12Y 304/24069
See application file for complete search history.

(56) References Cited

U.S. PATENT DOCUMENTS

| | | | |
|---|---|---|---|
| 2004/0126397 A1* | 7/2004 | Aoki ................ | A61K 38/4893 424/239.1 |
| 2022/0081682 A1* | 3/2022 | Yokouchi ............. | C07K 14/33 |
| 2022/0257730 A1* | 8/2022 | Tsau ...................... | A61K 47/64 |

FOREIGN PATENT DOCUMENTS

| | | |
|---|---|---|
| JP | 2021-571357 | 2/2023 |
| WO | 2005035730 A2 | 4/2005 |

OTHER PUBLICATIONS

Benefield et al., "Molecular assembly of botulinum neurotoxin progenitor complexes," Apr. 2, 2013, PNAS, vol. 110, No. 14, pp. 5630-5635. (Year: 2013).*

(Continued)

*Primary Examiner* — Gary B Nickol
*Assistant Examiner* — Amelia N Dickens
(74) *Attorney, Agent, or Firm* — Lando & Anastasi, LLP

(57) ABSTRACT

The present invention relates to a botulinum toxin type A complex, and a formulation thereof and a usage method therefor. The present invention provides the botulinum toxin type A complex, comprising an HA70 component, and an HA17 component, an HA33 component, an NINH component, and a BoNT/A1 component, wherein the botulinum toxin complex has a molecular weight of 740-790 kDa. Compared with the existing botulinum toxin complexes, the botulinum toxin complex of the present invention is smaller in molecular weight and higher in safety, and has a comparable treatment effect.

5 Claims, 4 Drawing Sheets

Figure 1:
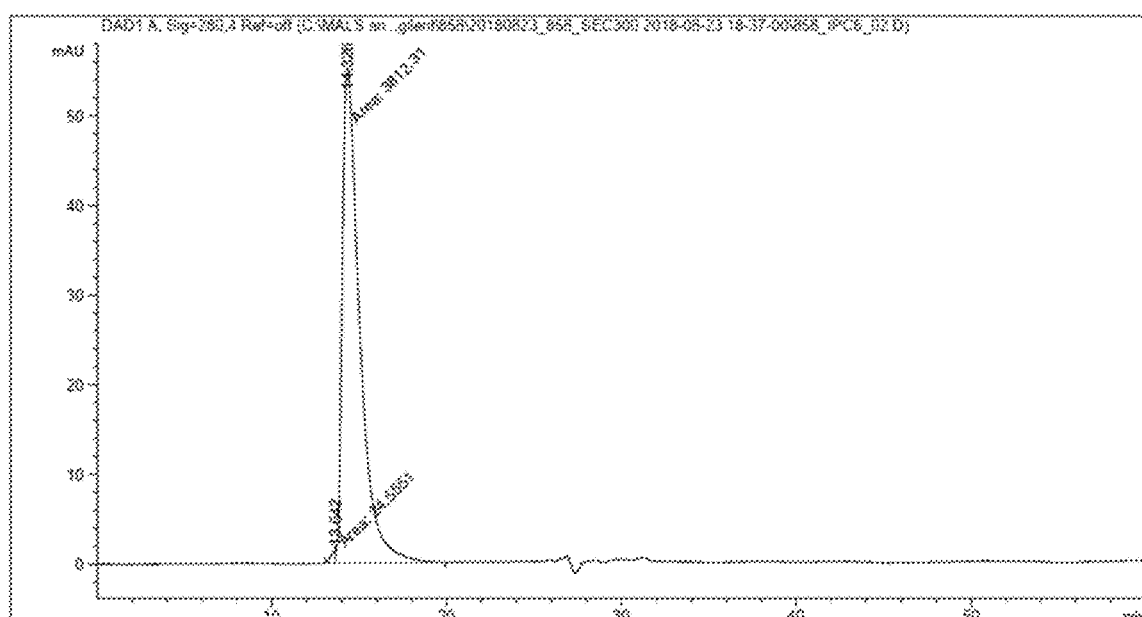

Specification includes a Sequence Listing.

Fitting Result

| | RI (dn/dc=0.185) | UV (EC=1.49) |
|---|---|---|
| Average Value | 779 | 759 |

(51) Int. Cl.
  *A61K 9/00*   (2006.01)
  *A61K 9/19*   (2006.01)
  *A61K 47/02*  (2006.01)
  *A61K 47/12*  (2006.01)
  *A61K 47/18*  (2017.01)
  *A61K 47/26*  (2006.01)
  *A61K 47/42*  (2017.01)
  *A61K 47/64*  (2017.01)
  *C07K 14/33*  (2006.01)
  *C12N 9/52*   (2006.01)

(52) U.S. Cl.
  CPC .............. *A61K 47/02* (2013.01); *A61K 47/12* (2013.01); *A61K 47/183* (2013.01); *A61K 47/26* (2013.01); *A61K 47/42* (2013.01); *A61K 47/64* (2017.08); *C07K 14/33* (2013.01); *C12N 9/52* (2013.01); *C12Y 304/24069* (2013.01)

(56) References Cited

OTHER PUBLICATIONS

Chin et al. "DNA sequences of the botulinum neurotoxin complex of Clostridium botulinum strain Hall A" Feb. 20, 2006, NIH Genbank, LOCUS DQ409059. (Year: 2006).*
Lee et al. "Structure of a Bimodular Botulinum Neurotoxin Complex Provides Insights into Its Oral Toxicity", Oct. 10, 2013, PLOS Pathogens, vol. 9 No. 10, Article e1003690, p. 1-13. (Year: 2013).*
Lee et al. "Structure of a Bimodular Botulinum Neurotoxin Complex Provides Insights into Its Oral Toxicity", Oct. 10, 2013, PLOS Pathogens, vol. 9 No. 10, Article e1003690, p. 1-13. (Year: 2013) (Year: 2013).*
Rossetto et al., "Tables of Toxicity of Botulinum and Tetanus Neurotoxins", Nov. 22, 2019, Toxins, vol. 11 No. 12, Article 686, p. 1-12. (Year: 2019).*
Benefield et al., "Molecular assembly of botulinum neurotoxin progenitor complexes," PNAS (2013) vol. 110, No. 14, pp. 5631-5635.
[No Author Listed] NCBI Reference Sequence: WP_011948507.1, botulinum neurotoxin hemagglutinin HA70 subunit [Clostridium botulinum] NCBI (2020) 2 pages.
[No Author Listed] NCBI Reference Sequence: WP_003356711.1, hemagglutinin [Clostridium botulinum] NCBI (2013) 1 page.
[No Author Listed] GenPept "PDB: 4LO0_A," Chain A, HA-33 (2013) 2 pages.
[No Author Listed] NCBI Reference Sequence: WP_011948510.1, non-toxic nonhemagglutinin NTNH [Clostridium botulinum] (2019) 2 pages.
[No Author Listed] NCBI Reference Sequence: WP_011948511.1, botulinum neurotoxin type A [Clostridium botulinum] (2020) 2 pages.
Xu et al., "Comparison of Excipients: Botulinum Toxin Injections for Asians," (2018) pp. 15-16. Chinese with English translation.
Benefield et al., "Molecular assembly of botulinum neurotoxin progenitor complexes", Proceedings of the National Academy of Sciences, vol. 110, No. 14, pp. 5630-5635 (2013).

Pirazzini et al., "Botulinum Neurotoxins: Biology, Pharmacology, and Toxicology", Pharmacological Reviews, vol. 69, No. 2, pp. 200-235 (2017).
Jin, Rongsheng, "Architecture of the Botulinum Neurotoxin Complex", Abstracts / Toxicon 123, pp. S44-S45 (2016).
Zhang, Li et al., "Complete DNA sequences of the botulinum neurotoxin complex of Clostridium botulinum type A-Hall (Allergan) strain", Gene, 315, pp. 21-32 (2003).
Lee, Kwangkook et al., "Structure of a Bimodular Botulinum Neurotoxin Complex Provides Insights in to Its Oral Toxicity", PLoS Pathogens, vol. 9(10), pp. 1-13 (Oct. 2013).
Fujinaga, Yukako, "Interaction of Botulinum Toxin with the Epithelial Barrier", Journal of Biomedicine and Biotechnology, Epub 2010, pp. 1-9.
Pirazzini, Marco et al., "Botulinum Neuroloxins: Biology , Pharmacology , and Toxicology", Pharmacological eviews, vol. 69, pp. 200-235 (Apr. 2017).
[No Author Listed] Gene ID: 5185056, Gene Symbol: CBO_RS04125, Gene Description: botulinum neurotoxin hemagglutinin HA70 subunit [ Clostridium botulinum A str. ATCC 3502 ] (2022) 3 pages.
[No Author Listed] Botulax Website (Accessed 2022): <https://botulax.ru/about/>.
Benefield, Desiree A. et al., "Molecular Assembly of Botulinum Neurotoxin Progenitor Complexes", PNAS, vol. 110, No. 14, Apr. 2, 2013, Apr. 2, 2013, pp. 5630-5635.
[No Author Listed] Instruction on the use of DYSPORT, Botulinum Toxin Type A Complex—Hemagglutinin, https://www.rceth.by/NDfiles/instr/5348_01_06_08_11_i.pdf.
NCBI Reference Sequence: AVY12225.1, Sequence 5721 from patent U.S. Pat. No. 9,878,056 (Apr. 12, 2018).
NCBI Reference Sequence: ACQ22039, Sequence 19 from patent U.S. Pat. No. 7,514,088 (Apr. 29, 2009).
NCBI Reference Sequence: ABE20280.1, Sequence 1 from patent U.S. Pat. No. 6,994,859 (Apr. 5, 2006).
NCBI Reference Sequence: WP_011948510.1, non-toxic nonhemagglutinin NTNH [Clostridium botulinum] (Aug. 29, 2019).
NCBI Reference Sequence: ABN37706.1, Sequence 5 from patent U.S. Pat. No. 7,172,764 (Feb. 7, 2007).
List of International Depository Authorities (IDA), World Intellectual Property Office (WIPO) (http://www.wipo.int/budapest/en/idadb <https://protect-us.mimecast.com/s/nagkCERZIwC3kA1AHNma90?domain=wipo.int).
Joo Kyung-joon, Botulium toxin side effects are caused by molecular weight, American Academy of Dermatology, (2006).
Kwok-Ho Lam extrinsic, "Architecture of the botulinum neurotoxin complex: a molecular machine for protection and delivery", current Opinion in Structural Biology, vol. 31, 89(Apr. 15, 2015. Online disclosure).
Ornella Rossetto et al., "Tables of Toxicity of Botulinum and Tetanus Neurotoxins", doi: 10.3390/toxins11120686.
NCBI Reference Sequence: 4LO4_1|Chain A|HA-70|Clostridium botulinum (1491).
NCBI Reference Sequence: 4LO0_1|Chains A, C[auth B]|HA-33|Clostridium botulinum (1491).
NCBI Reference Sequence: 3VOA_2|Chain B|NTNH|Clostridium botulinum (1491).
NCBI Reference Sequence: 3BTA_1|Chain A|Protein (Botulinum Neurotoxin Type A)| Clostridium botulinum (1491).

* cited by examiner

| Retention Time (min) | Width (min) | Height (mAU) | Peak Area | Percentage (%) |
|---|---|---|---|---|
| 13.642 | 0.2978 | 1.3745 | 24.5551 | 0.64 |
| 14.326 | 1.1506 | 55.2221 | 3812.31 | 99.36 |

BOTULINUM TOXIN TYPE A COMPLEX, AND FORMULATION THEREOF AND USAGE METHOD THEREFOR

CROSS-REFERENCE TO RELATED APPLICATIONS

This application is a U.S. national phase application under 35 U.S.C. § 371 of International Application No. PCT/CN2020/082450, filed Mar. 31, 2020, the entire contents of which are incorporated herein by reference in its entirety.

SEQUENCE LISTING

This application contains a Sequence Listing which has been submitted electronically in ASCII text format and is hereby incorporated by reference in its entirety. Said ASCII copy, created on Dec. 27, 2021, is named O2066-70007US_-_ Sequence_Listing.txt and is 30.3 kb in size.

FIELD

The present invention relates to a protein drug in the aesthetic or pharmaceutical field. Further, it relates to *Clostridium botulinum* toxin composition.

BACKGROUND

Wrinkles, one of the telltale signs of aging, can be caused by biochemical, histological, and physiologic changes that accumulate from environmental damage to the skin. In addition, there are other secondary factors that can cause characteristic folds, furrows, and creases of facial wrinkles (Stegman et al., The Skin of the Aging Face Cosmetic Dermatological Surgery, 2nd ed., St. Louis, Mo.: Mosby Year Book: 5-15 (1990)). These secondary factors include the constant pull of gravity, frequent and constant positional pressure on the skin (e.g., during sleep), and repeated facial movements caused by the contraction of facial muscles (Stegman et al., The Skin of the Aging Face Cosmetic Dermatological Surgery, 2nd ed., St. Louis, Mo.: Mosby Year Book: 5-15 (1990)).

Different techniques have been utilized in order to potentially mitigate some of the signs of aging. These techniques range from facial moisturizers containing alpha hydroxy acids and retinol to surgical procedures and injections of neurotoxins. For example, in 1986, Jean and Alastair Carruthers, a husband-and-wife team consisting of an oculoplastic surgeon and a dermatologist, developed a method of using the type A form of botulinum toxin for treatment of movement-associated wrinkles in the glabella area (Schantz and Scott, In Lewis G. E. (Ed) Biomedical Aspects of Botulinum, New York: Academic Press, 143-150 (1981)). The Carruthers' use of the type A form of botulinum toxin for the treatment of wrinkles led to the seminal publication of this approach in 1992 (Schantz and Scott, in Lewis G. E. (Ed) Biomedical Aspects of Botulinum, New York: Academic Press, 143-150 (1981)). By 1994, the same team reported experiences with other movement-associated wrinkles on the face (Scott, Opthalmol, 87:1044-1049 (1980)). This in turn led to the birth of the era of aesthetic treatment using the type A form of botulinum toxin.

The type A form of botulinum toxin is reported to be the most lethal natural biological agent known to man. Spores of *C. botulinum* are found in soil and can grow in improperly sterilized and sealed food containers. Botulism, which may be fatal, may be caused by the ingestion of the bacteria.

Botulinum toxin acts to produce paralysis of muscles by preventing synaptic transmission that inhibits the release of acetylcholine across the neuromuscular junction, and is thought to act in other ways as well. Its action essentially blocks signals that normally would cause muscle spasms or contractions, resulting in paralysis. During the last decade, botulinum toxin's muscle paralyzing activity has been harnessed to achieve a variety of therapeutic effects. Controlled administration of botulinum toxin has been used to provide muscle paralysis to treat a variety of medical conditions, for example, neuromuscular disorders characterized by hyperactive skeletal muscles. Conditions that have been treated with botulinum toxin include hemifacial spasm, adult onset spasmodic torticollis, anal fissure, blepharospasm, cerebral palsy, cervical dystonia, migraine headaches, strabismus, temporomandibular joint disorder, and various types of muscle cramping and spasms. More recently, the muscle-paralyzing effects of botulinum toxin have been applied to therapeutic and aesthetic facial applications such as treatment of wrinkles, frown lines, and other results of spasms or contractions of facial muscles.

In addition to the type A form of botulinum toxin, there are seven other serologically distinct forms of botulinum toxin that are also produced by the gram-positive bacteria *Clostridium botulinum*. Of these eight serologically distinct types of botulinum toxin, the seven that can cause paralysis have been designated botulinum toxin serotypes A, B, C, D, E, F and G. Each of these is distinguished by neutralization with type-specific antibodies. The molecular weight of each of the botulinum toxin proteins is about 150 kDa. Due to the molecule size and molecular structure of botulinum toxin, it cannot cross stratum corneum and the multiple layers of the underlying skin architecture. The different serotypes of botulinum toxin vary in the effect and in the severity and duration of the paralysis they evoke in different animal species. For example, in rats, it has been determined that botulinum toxin type A is 500 times more potent than botulinum toxin type B, as measured by the rate of paralysis. Additionally, botulinum toxin type B has been determined to be non-toxic in primates at a dose of 480 U/kg.

The botulinum toxin, which is released by *Clostridium botulinum* bacteria, is a component of a toxin complex containing the approximately 150 kDa botulinum toxin protein molecule along with associated non-toxin proteins. These endogenous non-toxin proteins are believed to include a family of hemagglutinin proteins, as well as non-hemagglutinin proteins. The non-toxin proteins have been reported to stabilize the botulinum toxin molecule in the toxin complex and protect it against denaturation by digestive acids when toxin complex is ingested. Thus, the non-toxin proteins of the toxin complex protect the activity of the botulinum toxin and thereby enhance systemic penetration when the toxin complex is administered via the gastrointestinal tract. Additionally, it is believed that some of the non-toxin proteins specifically stabilize the botulinum toxin molecule in blood.

The presence of non-toxin proteins in the toxin complexes typically causes the toxin complexes to have molecular weights that are greater than that of the bare botulinum toxin molecule, which is about 150 kDa, as previously stated. For example, *Clostridium botulinum* bacteria can produce botulinum type A toxin complexes that have molecular weights of about 900 kDa, 500 kDa or 300 kDa. Botulinum toxin types B and C are produced as complexes having a molecular weight of about 700 kDa or about 500 kDa. Botulinum toxin type D is produced as complexes having molecular weights of about 300 kDa or 500 kDa. Botulinum toxin types E and F are only produced as complexes having a molecular weight of about 300 kDa.

To provide additional stability to botulinum toxin, the toxin complexes are conventionally stabilized by combining the complexes with albumin during manufacturing. For example, BOTOX® (Allergan, Inc., Irvine, Calif.) is a botulinum toxin-containing formulation that contains 100 U of type A botulinum toxin with ancillary proteins, 0.5 milligrams of human albumin, and 0.9 milligrams of sodium chloride. The albumin serves to bind and to stabilize toxin complexes in disparate environments, including those associated with manufacturing, transportation, storage, and administration.

However, the number of available botulinum toxin type A compositions is limited. There is still a need for new type A botulinum toxin compositions and formulations in this field.

SUMMARY OF THE INVENTION

In view of the need for more type A botulinum toxin complexes in the art, the inventors provide a new *Clostridium botulinum* toxin Type A complex. Compared with existing products (such as Botox®), the *Clostridium botulinum* toxin Type A complex of the present invention has a smaller molecular weight, and therefore has a lower production cost; and has increased stability and safety.

In one aspect, the present invention provides a *Clostridium botulinum* toxin Type A complex comprising a HA70 component, a HA17 component, a HA33 component, a NTNH component, and a BoNT/A1 component, wherein the *Clostridium botulinum* toxin complex has a molecular weight of 740-790 kDa.

In one embodiment, the *Clostridium botulinum* toxin Type A complex consists of the HA70 component, the HA17 component, the HA33 component, the NTNH component, and the BoNT/A1 component, and has a molecular weight of about 760 kDa.

In one embodiment, the HA70 component comprises any of:
(1) the amino acid sequence of SEQ ID NO. 1; or
(2) the amino acid sequence obtained by adding, deleting, substituting or inserting one or more amino acids in SEQ ID NO. 1, with retaining the function of the HA70 component.

In one embodiment, the HA17 component comprises any of:
(1) the amino acid sequence of SEQ ID NO. 2; or
(2) the amino acid sequence obtained by adding, deleting, substituting or inserting one or more amino acids in SEQ ID NO. 2, with retaining the function of the HA17 component.

In one embodiment, the HA33 component comprises any of:
(1) the amino acid sequence of SEQ ID NO. 3; or
(2) the amino acid sequence obtained by adding, deleting, substituting or inserting one or more amino acids in SEQ ID NO. 3, with retaining the function of the HA33 component.

In one embodiment, the NTNH component comprises any of:
(1) the amino acid sequence of SEQ ID NO. 4; or
(2) the amino acid sequence obtained by adding, deleting, substituting or inserting one or more amino acids in SEQ ID NO. 4, with retaining the function of the NTNH component.

In one embodiment, the BoNT/A1 component comprises any of:
(1) the amino acid sequence of SEQ ID NO. 5; or
(2) the amino acid sequence obtained by adding, deleting, substituting or inserting one or more amino acids in SEQ ID NO. 5, with retaining the function of the BoNT/A1 component.

In another aspect, the present invention provides a nucleic acid encoding the *Clostridium botulinum* toxin Type A complex of the present invention.

In another aspect, the present invention provides a pharmaceutical composition comprising the *Clostridium botulinum* toxin Type A complex of the present invention and a pharmaceutically or dermatologically acceptable carrier.

In yet another aspect, the present invention provides a liquid formulation comprising the *Clostridium botulinum* toxin Type A complex of the application, which comprises human serum albumin, methionine, arginine, sodium chloride, Polysorbate 80, citrate buffer, and/or phosphate buffer.

In yet another aspect, the present invention provides an aesthetic method comprising administering to a subject in need thereof an effective amount of the *Clostridium botulinum* toxin Type A complex, the pharmaceutical composition or the liquid formulation of the present invention.

In one embodiment, the aesthetic method comprises reducing the appearance of fine lines and/or wrinkles, particularly on the face, or enlarging eyes, lifting the corners of mouth, or smoothing lines that appear on the upper lip, or generally relieving the muscle tone.

In yet another aspect, the present invention provides a method for treating or preventing a disease caused by synaptic transmission or release of acetylcholine in a subject in need thereof, comprising administering to the subject an effective amount of the *Clostridium botulinum* toxin Type A complex, the pharmaceutical composition or the liquid formulation of the present invention.

In one embodiment, the disease is selected from the group consisting of neuromuscular disorders characterized by skeletal muscle hyperactivity, neuropathic pain, migraine, overactive bladder, rhinitis, sinusitis, acne, dystonia, dystonic contraction, hyperhidrosis, hypersecretion of one or more glands controlled by the cholinergic nervous system, hemifacial spasm, adult-onset spastic torticollis, anal fissure, blepharospasm, cerebral palsy, cervical dystonia, strabismus, temporomandibular joint disorders and various types of muscle convulsions and spasms.

In yet another aspect, the present invention provides use of the *Clostridium botulinum* toxin Type A complex, the pharmaceutical composition or the liquid formulation of the present invention in the preparation of an aesthetic product or a medicament, wherein the aesthetic product is used to reduce fine lines and/or the appearance of wrinkles, especially on the face, or enlarge eyes, lift the corners of mouth, or smooth lines that appear on the upper lip, or generally relieve muscle tone; wherein the medicament is used to treat or prevent a disease caused by synaptic transmission or release of acetylcholine.

In one embodiment, the disease is selected from the group consisting of neuromuscular disorders characterized by skeletal muscle hyperactivity, neuropathic pain, migraine, overactive bladder, rhinitis, sinusitis, acne, dystonia, dystonic contraction, hyperhidrosis, hypersecretion of one or more glands controlled by the cholinergic nervous system, hemifacial spasm, adult-onset spastic torticollis, anal fissure, blepharospasm, cerebral palsy, cervical dystonia, strabismus, temporomandibular joint disorders and various types of muscle convulsions and spasms.

In yet another aspect, the present invention provides a *Clostridium botulinum* toxin Type A complex, pharmaceutical composition or liquid formulation for use in reducing the appearance of fine lines and/or wrinkles, especially on the face, or enlarging eyes and lifting the corners of mouth, or smoothing lines appearing on the upper lip, or generally relieving muscle tone; wherein the medicament is used to treat or prevent a disease caused by synaptic transmission or release of acetylcholine.

In one embodiment, the disease is selected from the group consisting of neuromuscular disorders characterized by skeletal muscle hyperactivity, neuropathic pain, migraine, overactive bladder, rhinitis, sinusitis, acne, dystonia, dystonic contraction, hyperhidrosis, hypersecretion of one or more glands controlled by the cholinergic nervous system, hemifacial spasm, adult-onset spastic torticollis, anal fissure, blepharospasm, cerebral palsy, cervical dystonia, strabismus, temporomandibular joint disorders and various types of muscle convulsions and spasms.

The *Clostridium botulinum* toxin Type A complex of the present invention (also referred to as "OBI-858" herein) has the following advantages compared with the commercial product Botox®:

(1) its therapeutic effect (Effective Dose: $ED_{50}$) is comparable to that of Botox® in a mouse animal experiment, but its lethal dose (Lethal Dose: $LD_{50}$) is higher than that of Botox® in a mouse animal experiment, and its margin of safety (MOS) is also higher than that of Botox® in a mouse animal experiment, indicating that the *Clostridium botulinum* toxin preparation of the present invention has a higher safety than the commercial product Botox®;

(2) the *Clostridium botulinum* toxin Type A complex of the present invention has a total protein molecular weight of 760 kDa, which is different from Botox® with a molecular weight of 900 kDa, and is a new *Clostridium botulinum* toxin Type A complex;

(3) the formulation of the *Clostridium botulinum* toxin Type A complex of the present invention has an improved stability.

BRIEF DESCRIPTION IF THE FIGURES

FIG. 1: Product purity measurement by using Size exclusion chromatography-High Performance Liquid Chromatography (SEC-HPLC).

Figure 2:
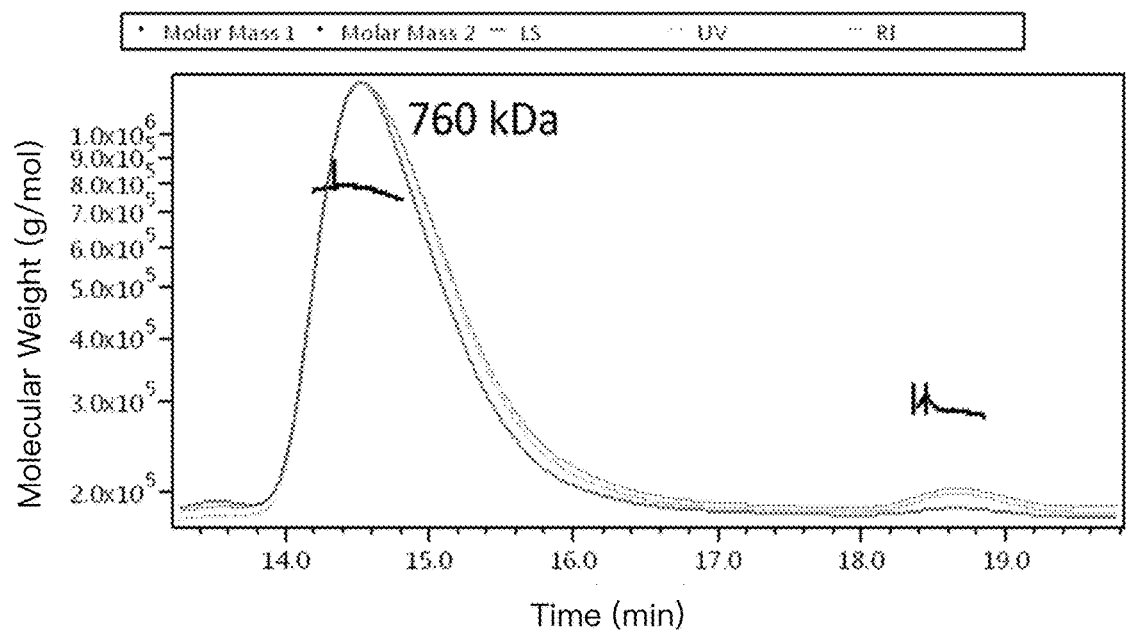

FIG. 2: Product molecular weight measurement by using multi-angle light scattering (MALS).

Figure 3:
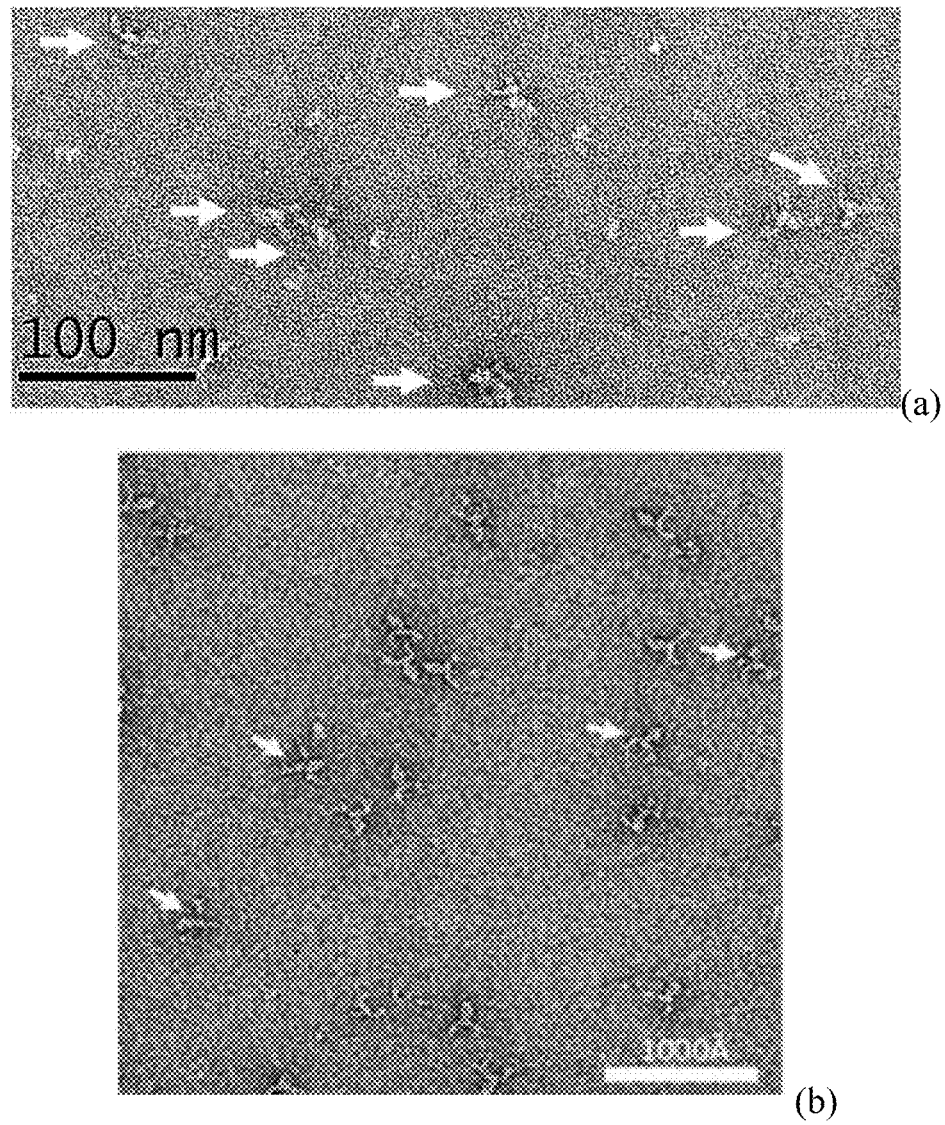

FIG. 3: Product total protein molecular weight measurement by using electron microscopy. (a) OBI-858, the arrow indicated the toxin particles; and (b) Reference studies of 760 kDa L-PTC/A, the arrow indicated the four different orientations.

Figure 4:
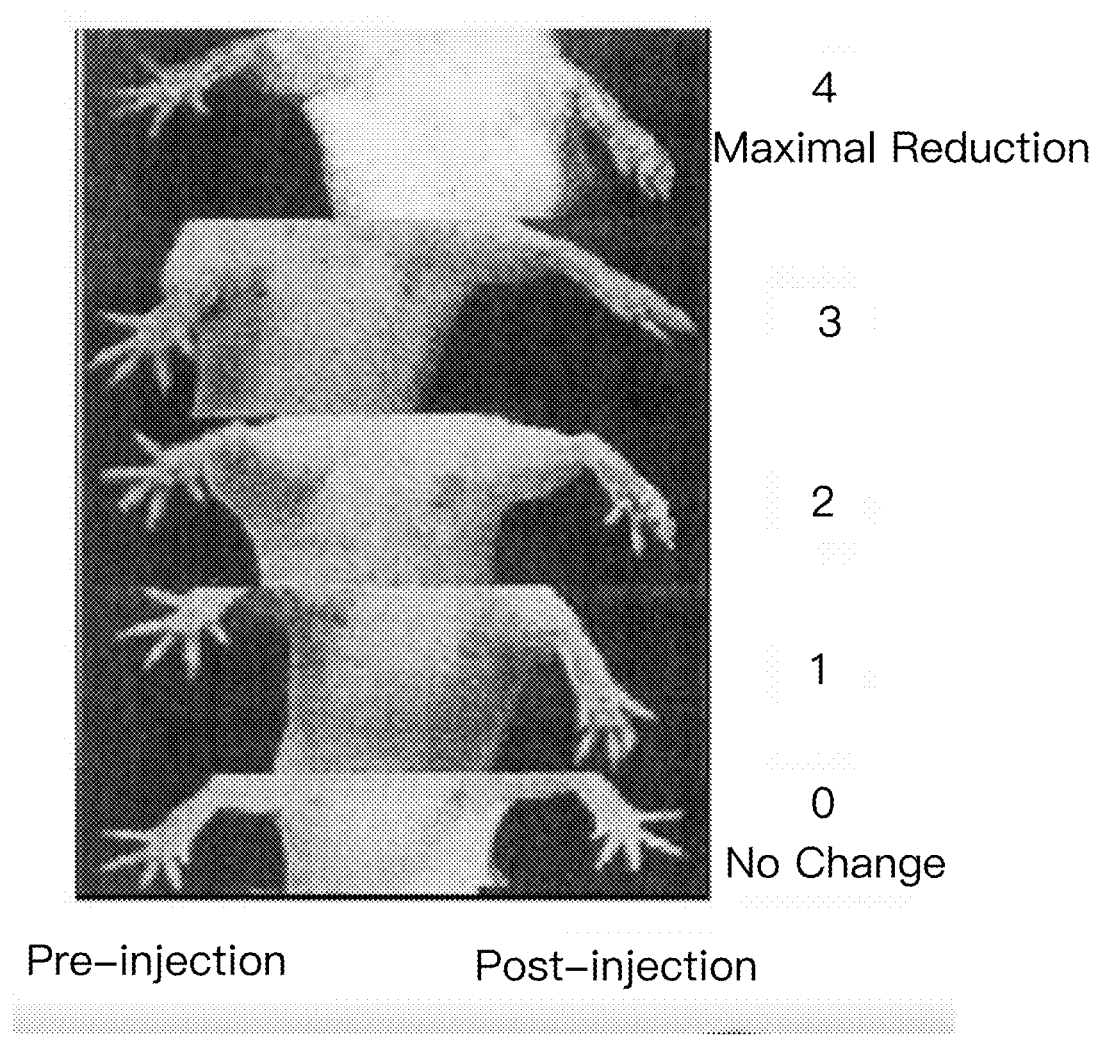

FIG. 4: The scoring picture of Digit Abduction Score (DAS) assay.

DETAILED DESCRIPTION OF THE INVENTION

The present invention relates to a *Clostridium botulinum* toxin Type A complex and its liquid formulation. As described herein, the composition of the present invention can be used as an injectable application for providing botulinum toxin to a subject for various therapeutic and/or aesthetic purposes. Compared with existing *Clostridium botulinum* toxin Type A complex products, the *Clostridium botulinum* toxin Type A complex of the present invention has better safety and enhanced or comparable efficacy. Regarding the *Clostridium botulinum* toxin Type A complex of the present invention, the present invention provides a liquid formulation for the *Clostridium botulinum* toxin Type A complex, which has excellent stability.

The term "*Clostridium botulinum* toxin Type A complex" as used herein refers to a type A *Clostridium botulinum* toxin protein molecule of about 150 kD and related endogenous non-toxin proteins, i.e. a complex formed by hemagglutinin (HA) and non-toxin non-hemagglutinin (NTNH). The hemagglutinin protein is composed of subcomponents of 70, 33, and 17 kDa, namely HA70, HA33, and HA17. The *Clostridium botulinum* toxin complex does not need to be derived from *Clostridium botulinum* as a single toxin. For example, *Clostridium botulinum* toxin or modified *Clostridium botulinum* toxin can be prepared recombinantly, and then combined with non-toxin proteins. Recombinant *Clostridium botulinum* toxin can also be purchased and combined with non-toxic proteins.

The *Clostridium botulinum* toxin Type A complex herein may also contain HA70, HA33, HA17, NTNH or BoNT/A1 as described herein, or a variant thereof. A variant has an amino acid sequence obtained by adding, deleting, substituting or inserting one or more amino acids in the sequence described herein (e.g., any one of SEQ ID Nos. 1-5).

The term "one or more" refers to the number of regions that do not impair protein activity to a large extent. The number referred to by the term "one or more" is, for example, 1 to 100, preferably 1 to 80, more preferably 1 to 50, still more preferably 1 to 40, and particularly preferably 1 to 30, 1 to 20, 1 to 10 or 1 to 5 (e.g. 1, 2, 3, 4, or 5).

The sequences of each component of the *Clostridium botulinum* toxin Type A complex in the examples are provided below.

HA70
(SEQ ID NO. 1)
MNSSIKKIYNDIQEKVINYSDTIDLADGNYVVRRGDGWILSRQNQILGGS

VISNGSTGIVGDLRVNDNAIPYYYPTPSFNEEYIKNNIQTVFTNFTEANQ

IPIGFEFSKTAPSNKNLYMYLQYTYIRYEIIKVLQHEIIERAVLYVPSLG

YVKSIEFNPGEKINKDFYFLTNDKCILNEQFLYKKILETTKNIPTNNIFN

SKVSSTQRVLPYSNGLYVINKGDGYIRTNDKDLIGTLLIEAGSSGSIIQP

RLRNTTRPLFTTSNDTKFSQQYTEERLKDAFNVQLFNTSTSLFKFVEEAP

SDKNICIKAYNTYEKYELIDYQNGSIVNKAEYYLPSLGYCEVTNAPSPES

EVVKMQVAEDGFIQNGPEEEIVVGVIDPSENIQEINTAISDNYTYNIPGI

VNNNPFYILFTVNTTGIYKINAQNNLPSLKIYEAIGSGNRNFQSGNLCDD

DIKAINYITGFDSPNAKSYLVVLLNKDKNYYIRVPQTSSNIENQIQFKRE

EGDLRNLMNSSVNIIDNLNSTGAHYYTRQSPDVHDYISYEFTIPGNFNNK

DTSNIRLYTSYNQGIGTLFRVTETIDGYNLINIQQNLHLLNNTNSIRLLN

GAIYILKVEVTELNNYNIRLHIDITN

HA17
(SEQ ID NO. 2)
MSVERTFLPNGNYNIKSIFSGSLYLNPVSKSLTFSNESSANNQKWNVEYM

AENRCFKISNVAEPNKYLSYDNFGFISLDSLSNRCYWFPIKIAVNTYIML

SLNKVNELDYAWDIYDTNENILSQPLLLLPNFDIYNSNQMFKLEKI

HA33

(SEQ ID NO. 3)
MEHYSVIQNSLNDKIVTISCKADTNLFFYQVAGNVSLFQQTRNYLERWRL

IYDSNKAAYKIKSMDIHNTNLVLTWNAPTHNISTQQDSNADNQYWLLLKD

IGNNSFIIASYKNPNLVLYADTVARNLKLSTLNNSNYIKFIIEDYIISDL

NNFTCKISPILDLNKVVQQVDVTNLNVNLYTWDYGRNQKWTIRYNEEKAA

YQFFNTILSNGVLTWIFSNGNTVRVSSSNDQNNDAQYWLINPVSDTDETY

TITNLRDTTKALDLYGGQTANGTAIQVFNYHGDDNQKWNIRNP

NTNH (SEQ ID NO. 4)
MNINDNLSINSPVDNKNVVVVRARKTDTVFKAFKVAPNIWVAPERYYGES

LSIDEEYKVDGGIYDSNFLSQDSEKDKFLQAIITLLKRINSTNAGEKLLS

LISTAIPFPYGYIGGGYYAPNMITFGSAPKSNKKLNSLISSTIPFPYAGY

RETNYLSSEDNKSFYASNIVIFGPGANIVENNTVFYKKEDAENGMGTMTE

IWFQPFLTYKYDEFYIDPAIELIKCLIKSLYFLYGIKPSDDLVIPYRLRS

ELENIEYSQLNIVDLLVSGGIDPKFINTDPYWFTDNYFSNAKKVFEDHRN

IYETEIEGNNAIGNDIKLRLKQKFRININDIWELNLNYFSKEFSIMMPDR

FNNALKHFYRKQYYKIDYPENYSINGFVNGQINAQLSLSDRNQDIINKPE

EIINLLNGNNVSLMRSNIYGDGLKSTVDDFYSNYKIPYNRAYEYHFNNSN

DSSLDNVNIGVIDNIPEIIDVNPYKENCDKFSPVQKITSTREINTNIPWP

INYLQAQNTNNEKFSLSSDFVEVVSSKDKSLVYSFLSNVMFYLDSIKDNS

PIDTDKKYYLWLREIFRNYSFDITATQEINTNCGINKVVTWFGKALNILN

TSDSFVEEFQNLGAISLINKKENLSMPIIESYEIPNDMLGLPLNDLNEKL

FNIYSKNTAYFKKIYYNFLDQWWTQYYSQYFDLICMAKRSVLAQETLIKR

IIQKKLSYLIGNSNISSDNLALMNLTTTNTLRDISNESQIAMNNVDSFLN

NAAICVFESNIYPKFISFMEQCINNINIKTKEFIQKCTNINEDEKLQLIN

QNVFNSLDFEFLNIQNMKSLFSSETALLIKEETWPYELVLYAFKEPGNNV

IGDASGKNTSIEYSKDIGLVYGINSDALYLNGSNQSISFSNDFFENGLTN

SFSIYFWLRNLGKDTIKSKLIGSKEDNCGWEIYFQDTGLVFNMIDSNGNE

KNIYLSDVSNNSWHYITISVDRLKEQLLIFIDDNLVANESIKEILNIYSS

NIISLLSENNPSYIEGLTILNKPTTSQEVLSNYFEVLNNSYIRDSNEERL

EYNKTYQLYNYVFSDKPICEVKQNNNIYLTINNTNNLNLQASKFKLLSIN

PNKQYVQKLDEVIISVLDNMEKYIDISEDNRLQLIDNKNNAKKMIISNDI

FISNCLTLSYNGKYICLSMKDENHNWMICNNDMSKYLYLWSFK

BoNT/A1

(SEQ ID NO. 5)
MPFVNKQFNYKDPVNGVDIAYIKIPNAGQMQPVKAFKIHNKIWVIPERDT

FTNPEEGDLNPPPEAKQVPVSYYDSTYLSTDNEKDNYLKGVTKLFERIYS

TDLGRMLLTSIVRGIPFWGGSTIDTELKVIDTNCINVIQPDGSYRSEELN

LVIIGPSADIIQFECKSFGHEVLNLTRNGYGSTQYIRFSPDFTFGFEESL

EVDTNPLLGAGKFATDPAVTLAHELIHAGHRLYGIAINPNRVFKVNTNAY

YEMSGLEVSFEELRTFGGHDAKFIDSLQENEFRLYYYNKFKDIASTLNKA

KSIVGTTASLQYMKNVFKEKYLLSEDTSGKFSVDKLKFDKLYKMLTEIYT

EDNFVKFFKVLNRKTYLNFDKAVFKININVPKVNYTIYDGFNLRNTNLAAN

FNGQNTEINNMNFTKLKNFTGLFEFYKLLCVRGIITSKTKSLDKGYNKAL

NDLCIKVNNWDLFFSPSEDNFTNDLNKGEEITSDTNIEAAEENISLDLIQ

QYYLTFNFDNEPENISIENLSSDIIGQLELMPNIERFPNGKKYELDKYTM

FHYLRAQEFEHGKSRIALTNSVNEALLNPSRVYTFFSSDYVKKVNKATEA

AMFLGWVEQLVYDFTDETSEVSTTDKIADITIIIPYIGPALNIGNMLYKD

DFVGALIFSGAVILLEFIPEIAIPVLGTFALVSYIANKVLTVQTIDNALS

KRNEKWDEVYKYIVTNWLAKVNTQIDLIRKKMKEALENQAEATKAIINYQ

YNQYTEEEKNNINFNIDDLSSKLNESINKAMININKFLNQCSVSYLMNSM

IPYGVKRLEDFDASLKDALLKYIYDNRGTLIGQVDRLKDKVNNTLSTDIP

FQLSKYVDNQRLLSTFTEYIKNIINTSILNLRYESNHLIDLSRYASKINI

GSKVNFDPIDKNQIQLFNLESSKIEVILKNAIVYNSMYENFSTSFWIRIP

KYFNSISLNNEYTIINCMENNSGWKVSLNYGEIIWTLQDTQEIKQRVVFK

YSQMINISDYINRWIFVTITNNRLNNSKIYINGRLIDQKPISNLGNIHAS

NNIMFKLDGCRDTHRYIWIKYFNLFDKELNEKEIKDLYDNQSNSGILKDF

WGDYLQYDKPYYMLNLYDPNKYVDVNNVGIRGYMYLKGPRGSVMTTNIYL

NSSLYRGTKFIIKKYASGNKDNIVRNNDRVYINVVVKNKEYRLATNASQA

GVEKILSALEIPDVGNLSQVVVMKSKNDQGITNKCKMNLQDNNGNDIGFI

GFHQFNNIAKLVASNWYNRQIERSSRTLGCSWEFIPVDDGWGERPL

The present invention also relates to a method for producing a biological effect by injecting an effective amount of the composition of the present invention into a subject or patient in need thereof. The biological effect can include, for example, muscle paralysis, reduction of excessive secretion or sweating, treatment of neuropathic pain or migraine, control of rhinitis or sinusitis, treatment of overactive bladder, reduction of muscle spasms, prevention or reduction of acne, reduction or enhancement of immune response, reduction of wrinkles, or prevention or treatment of various other diseases.

The composition of the present invention is in a form that allows injection into the skin or epithelium of a subject or patient (i.e., a human or other mammal in need of specific treatment). The term "need" is meant to include needs related to drugs or health (e.g., to treat conditions involving undesirable facial muscle spasms), as well as aesthetic and subjective needs (e.g., to change or improve the appearance of facial tissues). In their simplest form, the composition may comprise an aqueous pharmaceutically acceptable diluent, such as buffered saline (e.g., phosphate buffered saline). However, the composition may comprise other ingredients commonly present in injectable pharmaceutical or aesthetic compositions, including a dermatologically or pharmaceutically acceptable carrier that is compatible with the tissue to be applied. As used herein, the term "dermatologically or pharmaceutically acceptable" means that the compositions or its components described herein are suitable for contact with tissues or for use in general patients without undue toxicity, incompatibility, instability, allergic reactions, etc. When appropriate, the composition of the present invention may comprise any components conventionally used in the field under consideration, especially in aesthetics and dermatology.

The *Clostridium botulinum* toxin complex according to the present invention can be delivered to the muscles under the skin by injection (usually using a syringe), or applied to the glandular structure in the skin in an effective amount to produce paralysis, produce relaxation, relieve contraction, prevent or relieve spasticity, reduce glandular output or produce other required effects. Local delivery of botulinum toxin in this manner allows dose reduction, toxicity reduction, and allow more precise dose optimization relative to injectable or implantable materials to achieve the desired effect.

The *Clostridium botulinum* toxin complex of the present invention is administered to deliver an effective amount of botulinum toxin. The term "effective amount" as used herein refers to such amount that is sufficient to produce the desired muscle paralysis or other biological or aesthetic effects, but it is implicitly a safe amount, that is, it is low enough to avoid serious side effects. The desired effect includes relaxing certain muscles, for example, reducing the appearance of fine lines and/or wrinkles, especially on the face, or adjusting the appearance of the face in other ways, such as enlarging eyes, raising the corners of mouth, or relieving muscle tone. Muscle tone can be relieved on the face or elsewhere. The *Clostridium botulinum* toxin complex of the present invention can be administered to patients by injection for the treatment of, e.g., wrinkles, undesirable facial muscle or other muscle spasms, hyperhidrosis, acne or other diseases of the body that require relief of muscle pain or spasms. The *Clostridium botulinum* toxin complex is administered to muscle or other skin-related or other target tissue structures by injection. For example, the *Clostridium botulinum* toxin complex can be administered to legs, shoulders, backs (including lower backs), armpits, palms, feet, necks, faces, groins, back of hands or feet, elbows, upper arms, knees, upper legs, buttocks, torsos, pelvis, or any other part of the body in need thereof.

The administration of the *Clostridium botulinum* toxin complex of the present invention can also be used to treat other conditions, including any conditions that would benefit from the prevention of synaptic transmission or release of acetylcholine. For example, conditions that can be treated by the complex of the present invention include, but are not limited to, neuropathic pain, migraine or other headache pain, overactive bladder, rhinitis, sinusitis, acne, dystonia, dystonic contraction, hyperhidrosis, and hypersecretion of one or more glands controlled by the cholinergic nervous system, neuromuscular disorders characterized by skeletal muscle hyperactivity. Conditions treated with botulinum toxin include half-face spasm, hemifacial spasm, adult-onset spasmodic torticollis, anal fissure, blepharospasm, cerebral palsy, cervical dystonia, strabismus, temporomandibular joint disorders and various types of muscle convulsions and spasms. The complex of the present invention can also be used to reduce or enhance immune response, or to treat other conditions for which injection of *Clostridium botulinum* toxin complex has been suggested or administered. The *Clostridium botulinum* toxin complex of the present invention can be prepared in solid form, such as lyophilized powder, tablets, etc., and reconstituted in water for injection before use.

The *Clostridium botulinum* toxin complex, composition or formulation of the present invention is administered by or under the guidance of a physician or other health care professional. They can be administered in one treatment or in a series of treatments over time. In a preferred embodiment, the *Clostridium botulinum* toxin complex, composition or formulation according to the present invention is injected at one or more locations where *Clostridium botulinum* toxin-related effects are required. Due to the nature of the *Clostridium botulinum* toxin complex, the botulinum toxin is preferably administered in an amount, rate, and frequency that produces the desired result without producing any adverse or undesirable results.

The formulation herein comprises human serum albumin, methionine, arginine, sodium chloride, Polysorbate 80, citrate buffer, and/or phosphate buffer. Preferably, the formulation comprises human serum albumin, sodium chloride and Polysorbate 80 dissolved in 50 mM citrate buffer. In the formulation, the concentration of human serum albumin may be 0.1-1, such as 0.2, 0.3, 0.4, 0.5, 0.6, 0.7, 0.8, or 0.9 mg/mL. The concentration of sodium chloride may be 5-20, such as 6, 7, 8, 9, 10, 11, 12, 13, 14, 15, 16, 17, 18, or 19 mg/mL, more preferably 11.25 mg/mL. The concentration of Polysorbate 80 dissolved in 50 mM citrate buffer may be 0.1-0.3, such as 0.2 mg/mL, more preferably 0.188 mg/mL. The formulation has a certain pH value, such as 4-8, preferably pH 5.6.

Hereinafter, the inventive concept will be described in more detail by referring to the following examples. However, these examples are for illustrative purposes only, and are not intended to limit the scope of the invention.

EXAMPLE

Example 1: The Manufacture Process of OBI-858

The Manufacture Process of OBI-858 Drug Substance (DS):

Frozen OBI-858 bacteria was reconstituted from cell-bank and cultivated within medium. Then the bacteria was transferred to fermenter. After cultivation, cell and its fragment was removed by filtration. The purification procedure included: two-steps precipitation, buffer-exchange, and column-chromatography. After column-chromatography, DS solution was filtered by 0.22 µm filter and directly transferred into an isolator and lyophilized.

The Manufacture Process of OBI-858 Drug Product (DP):

OBI-858 DS powder was reconstituted within formulation buffer. The reconstituted solution was aseptic filtered by 0.22 µm filters and directly transferred into a sterile bag located in isolator. Then the solution was lyophilized to obtain OBI-858 DP.

Example 2: The Identification of OBI-858

(1) Genome Sequence Alignment

The production strain of OBI-858 was developed independently and confirmed 98.28% sequence identity compared to *Clostridium botulinum* A str. ATCC 3502, 89.69% sequence identity compared to *Clostridium botulinum* A str. Hall through whole genome sequencing (Table 1). Therefore, it differs to the marketing products under bacteria genome analysis.

TABLE 1

Genome sequence alignment of *Clostridium botulinum* strains

| *Clostridium botulinum* strain | Genome sequence (%) identity |
|---|---|
| *Clostridium botulinum* A str. ATCC 3502 | 98.28 |
| *Clostridium botulinum* A str. ATCC 19397 | 90.29 |
| *Clostridium botulinum* A str. Hall | 89.69 |
| *Clostridium botulinum* H04402 065(A5) | 68.98 |
| *Clostridium botulinum* A2 str. Kyoto | 68.39 |
| *Clostridium botulinum* A3 str. Loch Maree | 48.84 |

(2) Protein Composition Analysis

Experimental Materials/Method:

In order to achieve the highest sequence coverage, OBI-858 protein sample was digested with different enzymes followed by LC-MS/MS analysis. OBI-858 protein was first denatured with 6 M urea, reduced with 10 mM DTT at 37° C. for 1 hour, and alkylated with 50 mM IAM in dark at room temperature for 30 min. The resulting proteins were digested in 50 mM ammonium bicarbonate with the following digestion conditions:
  (a) Trypsin digestion at 37° C. for 18 hours;
  (b) Glu-C digestion at 37° C. for 18 hours;
  (c) Trypsin digestion at 37° C. for 18 hours+Glu-C digestion at 37° C. for 18 hours;
  (d) Lys-C digestion at 37° C. for 18 hours;
  (e) Chymotrypsin digestion at 37° C. for 18 hours;
  (f) Thermolysin digestion at 37° C. for 18 hours.

After digestion, the protein sample was diluted and acidified with 0.1% FA for MS analysis.

Samples were analyzed with Q Exactive mass spectrometer (Thermo Scientific) coupled with Ultimate 3000 RSLC system (Dionex). The LC separation was performed using the C18 column (Acclaim PepMap RSLC, 75 μm×150 mm, 2 μm, 100 Å) with the gradient shown below:

TABLE 2

LC-MS/MS analysis program

| Time (min) | Mobile phase A (%) | Mobile phase B (%) | Flow rate (μL/min) |
|---|---|---|---|
| 0 | 99 | 1 | 0.25 |
| 5.5 | 99 | 1 | 0.25 |
| 45 | 75 | 25 | 0.25 |
| 48 | 40 | 60 | 0.25 |
| 50 | 20 | 80 | 0.25 |
| 60 | 20 | 80 | 0.25 |
| 65 | 99 | 1 | 0.25 |
| 70 | 99 | 1 | 0.25 |

Mobile phase A: 0.1% FA
Mobile phase B: 95% ACN/0.1% FA

Full MS scan was performed with the range of m/z 300-2000, and the ten most intense ions from MS scan were subjected to fragmentation for MS/MS spectra. Raw data was processed into peak lists by Proteome Discoverer 1.4 for Mascot database search.

Experimental Result:

The result of OBI-858 *Clostridium botulinum* toxin Type A LC-MS/MS amino acid sequence analysis indicated that this toxin protein was composed of 71 kDa, 17 kDa, 34 kDa, 138 kDa, and 149 kDa five different size protein subunits (Table 3). The amino acid sequences SEQ ID NO. 1-5 of these subunits were achieved through protein sequencing.

TABLE 3

The theoretical values calculated from sequencing

| Protein sequence ID | Theoretical molecular weight (Da) | Protein name | Amino acid number | Molecular formula |
|---|---|---|---|---|
| A5HZZ4 | 71391.01 | HA-70 | 626 | $C_{3200}H_{4953}N_{837}O_{999}S_8$ |
| A5HZZ5 | 17034.31 | HA-17 | 146 | $C_{775}H_{1169}N_{191}O_{230}S_6$ |
| A5HZZ6 | 33872.73 | HA-33 | 293 | $C_{1515}H_{2313}N_{409}O_{468}S_4$ |
| A5HZZ8 | 138092.85 | NTNH | 1193 | $C_{6240}H_{9555}N_{1569}O_{1905}S_{33}$ |
| A5HZZ9 | 149425.84 | BoNT/A1 | 1296 | $C_{6763}H_{10452}N_{1744}O_{2011}S_{33}$ |

(3) Product purity measurement by using Size exclusion chromatography-High Performance Liquid Chromatography (SEC-HPLC) and Product molecular weight measurement by using multi-angle light scattering (MALS).

Experimental Materials/Method:

SEC-MALS analysis is combined size-exclusion high performance liquid chromatography and static light scattering analysis, which was performed using an Agilent 1260 HPLC system and connected in-line to a WYATT_DAWN HELEOS static light scattering detector with a SRT SEC-300 (5 μm, 7.8×300 mm) column. The Agilent 1260 HPLC system was controlled using Chemstation software (Agilent Technologies). The light scattering detector was controlled and analyzed using the ASTRA V software (Wyatt Technology). Isocratic elution was performed at a flow rate of 0.5 mL/min using a mobile phase of 150 mM PB/0.1M NaCl and 200 ppm NaN3; pH6.0. The concentration of the OBI-858 complex during the light scattering experiments was monitored by UV absorbance at 280 nm. The molecular mass for the OBI-858 complex was calculated from the light scattering data using a specific refractive index increment (dn/dc) value of 0.185 mL/g and UV Extinction Coefficient 1.49 mL/(mg*cm).

Experimental Result:

FIG. 1 indicated product purity measurement by using Size exclusion chromatography-High Performance Liquid Chromatography (SEC-HPLC) and the purity was 99.36%. FIG. 2 indicated product molecular weight measurement by using multi-angle light scattering (MALS) and the molecular weight was closed to 760 kDa protein.

(4) Electron Microscopy Measurement

Experimental Materials/Method:

The negatively stained sample preparation was followed the standard procedure. Briefly, a 4 μL drop of sample solution was adsorbed to a glow-discharged carbon-coated copper grid, washed with one drops of deionized water, stained with 2% uranyl acetate, and air dry. Images of sample were recorded using a JEM-2100F Transmission Electron Microscope (TEM) equipped with a field emission electron source and operated at an acceleration voltage of 200 kV. Images were recorded on a DE12 camera.

Experimental Result:

FIG. 3 indicated product total protein molecular weight measurement by using electron microscopy. FIG. 3a indicated OBI-858, the arrow indicated the toxin particles; FIG. 3b indicated reference studies of 760 kDa L-PTC/A, the arrow indicated the four different orientations. Therefore, this product differs to 900 kDa *Clostridium botulinum* toxin Type A on the market.

Example 3: OBI-858 Efficacy Study

The purpose of this study was to evaluate the single-dose acute intramuscular (IM) efficacy of the test article, OBI-858, in female ICR mice. The efficacy of the test article was determined by Digit Abduction Scoring assay (DAS assay) for calculation of IM median effective dose ($ED_{50}$). Safety margin was determined as a ratio of 72 h IM $LD_{50}$ to 48 h IM $ED_{50}$.

Experimental Materials/Method:
Test Article, Reference Article, Vehicle, and Control
Test Article
  Name: OBI-858
  Supplier: OBI Pharma, Inc.
  Batch number: 14004-25, 14004-30, 14004-35, 14004-45
  Storage Condition: −15-−25° C.
  Other Characteristics: One vial of sterilized powder containing 1,350,440 units
Reference Article
  Name: BOTOX®
  Supplier: Allergan Inc.
  Batch number: C3461 C2
  Storage Condition: −15-−25° C.
  Other Characteristics: 50 Units of *Clostridium botulinum* toxin Type A [per vial]

Vehicle and Control

Dilution buffer (30 mM phosphate buffered saline with 0.2% w/v gelatin, pH 6.8) was used as vehicle for formulation preparation and negative control at dosing.

Preparation and Disposition of Dose Formulations

All formulations were freshly prepared for same-day use on the scheduled dosing days.

Test Article Reconstitution and Dose Formulation

All dose formulation preparation procedures were performed in a Class II biosafety cabinet located in the Testing Facility. Dose formulation preparation was performed on the dosing day prior to the dosing procedures.

Test article was packaged as lyophilized material in a sterile sealed vial. To reconstitute the lyophilized test article, 1 mL of diluent buffer was injected into the vial containing the test article. The vial was shaken vigorously to dissolve the test article until no particulate matters in the reconstituted stock were visible by naked eye. If particulate matters are visible after vigorous shaking lasting for at least 3 minutes, OBI will be contacted for replacement of the test article vial. The reconstituted test article had a stock concentration of 1,350,440 $LD_{50}$ units (U) per mL. Serial dilutions were then performed in the following Table 4 with the reconstituted test article:

To prepare each serial dilution, the volume of diluent buffer required (see Serial Dilution Schedule, above) was transferred by micropipettes to a fresh glass vial with cap. The required volume of stock to be diluted was then transferred by micropipettes to the vial containing the diluent buffer. Mixing was performed by repeated gentle pipetting for several times followed by repeated gentle inversion, with cap screwed tight on the vial, for several times. Used micropipette tips were discarded at completion of each transfer step. The resultant Stock 5 through Stock 15 at completion of the dose formulation preparation were used as the test article dose formulations.

Reference Article Reconstitution and Dose Formulation

Reference article was packaged as lyophilized material in a sterile sealed vial. To reconstitute the lyophilized reference article, 0.2 mL of diluent buffer was injected into the vial containing the test article. The vial was then shaken vigorously to dissolve the test article until no particulate matter in the reconstituted stock was visible by naked eye. The reconstituted test article would have the stock concentration of 250 $LD_{50}$ units (U) per mL. Serial dilutions were then prepared from the reconstituted reference article in the following Table 5:

TABLE 4

Dilution Scheme for Test Article Starting Stock for Dose Formulation Preparation

| Stock ID | 0 (Reconstituted TA) | 1 | 2 | 3 | 4 | 5 | 6 | 7 |
|---|---|---|---|---|---|---|---|---|
| Group | N/A | N/A | N/A | N/A | N/A | 12 | 11 | 10 |
| Diluent Buffer Volume (μL) | 1000 | 700 | 600 | 600 | 2000 | 2445 | 402 | 396 |
| Stock ID | N/A | 0 | 1 | 2 | 3 | 4 | 5 | 6 |
| Stock Volume to ADD (μL) | N/A | 100 | 100 | 100 | 500 | 1000 | 2000 | 2000 |
| Total Volume (μL) | 1000 | 800 | 700 | 700 | 2500 | 3445 | 2402 | 2396 |
| Volume for Dosing (μL) | N/A | N/A | N/A | N/A | N/A | 1445 | 402 | 396 |
| Dilution Factor | 1 | 8 | 56 | 392 | 1960 | 6752.2 | 8109.4 | 9715.1 |
| Fold Dilution | 1 | 8 | 7 | 7 | 5 | 3.445 | 1.201 | 1.198 |
| Dose concentration (U/mL) | 1350440 | 168805 | 24115 | 3445 | 689 | 200 | 166.528 | 139.005 |

| Stock ID | 8 | 9 | 10 | 11 | 12 | 13 | 14 | 15 |
|---|---|---|---|---|---|---|---|---|
| Group | 9 | 8 | 7 | 6 | 5 | 4 | 3 | 2 |
| Diluent Buffer Volume (μL) | 406 | 394 | 508 | 488 | 509 | 781 | 778 | 800 |
| Stock ID | 7 | 8 | 9 | 10 | 11 | 12 | 13 | 14 |
| Stock Volume to ADD (μL) | 2000 | 2000 | 1000 | 1000 | 1000 | 1000 | 1000 | 1000 |
| Total Volume (μL) | 2406 | 2394 | 1508 | 1488 | 1509 | 1781 | 1778 | 1800 |
| Volume for Dosing (μL) | 406 | 1394 | 508 | 488 | 509 | 781 | 778 | 1800 |
| Dilution Factor | 11687.2 | 13989.6 | 21096.3 | 31391.3 | 47369.5 | 84365 | 150001 | 270001.8 |
| Fold Dilution | 1.203 | 1.197 | 1.508 | 1.488 | 1.509 | 1.781 | 1.778 | 1.8 |
| Dose concentration (U/mL) | 115.549 | 96.532 | 64.013 | 43.020 | 28.509 | 16.007 | 9.003 | 5.002 |

TABLE 5

Dilution Scheme for Reference Article Dose Formulation Preparation

| Stock ID | 0 (Reconstituted TA) | 1 | 2 | 3 | 4 | 5 | 6 | 7 | 8 | 9 | 10 | 11 |
|---|---|---|---|---|---|---|---|---|---|---|---|---|
| Group | N/A | 12 | 11 | 10 | 9 | 8 | 7 | 6 | 5 | 4 | 3 | 2 |
| Diluent Buffer Volume (µL) | 1600 | 360 | 281 | 253 | 229 | 187 | 366 | 327 | 305 | 391 | 373 | 360 |
| Stock ID | N/A | 0 | 1 | 2 | 3 | 4 | 5 | 6 | 7 | 8 | 9 | 10 |
| Stock Volume to ADD (µL) | 0 | 1440 | 1400 | 1280 | 1130 | 950 | 720 | 670 | 600 | 500 | 480 | 450 |
| Total Volume (µL) | 1600 | 1800 | 1681 | 1533 | 1359 | 1137 | 1086 | 997 | 905 | 891 | 853 | 810 |
| Volume for Dosing (µL) | 0 | 400 | 401 | 403 | 409 | 417 | 416 | 397 | 405 | 411 | 403 | 810 |
| Dilution Factor | | 1 | 1.25 | 1.501 | 1.798 | 2.162 | 2.587 | 3.903 | 5.807 | 8.759 | 15.609 | 27.739 | 49.930 |
| Fold Dilution | | 1 | 1.25 | 1.201 | 1.198 | 1.203 | 1.197 | 1.508 | 1.488 | 1.508 | 1.782 | 1.777 | 1.8 |
| Dose concentration (U/mL) | | 250 | 200 | 166.568 | 139.078 | 115.642 | 96.623 | 64.059 | 43.049 | 28.541 | 16.016 | 9.013 | 5.007 |

To prepare each serial dilution, the volume of diluent buffer required (see Serial Dilution Schedule, above) was transferred by micropipette to a fresh glass vial with cap. The required volume of stock to be diluted was then transferred by micropipette to the vial containing the diluent buffer. Mixing was performed by repeated gentle pipetting for several times followed by repeated gentle inversion, with cap screwed tight on the vial, for several times. Used micropipette tips were discarded at completion of each transfer step. The resultant Stock 1 through Stock 11 at completion of the dose formulation preparation were used as the reference article dose formulations.

Study Animals
  Study animals are described in following:
  Strain and species: ICR mice
  Source: BioLASCO Taiwan Co., Ltd (Taipei, Taiwan)
  Number of animals for group assignment: 236 females per batch; 4 batches
  Number of spare animals: 14 females per batch; 4 batches
  Weights at dosing day: 18-22 g (Body weight range will be within ±10% of the mean weight)
  Identification: Ear-notch, body or tail marking with dye, and cage card
  Justification for selection: The established assay procedures for efficacy and toxicity of the drug class of test article and reference article in this study are designed with the mouse as the test system. Female animals were used in the development of the procedures and were also shown in previous study to be more susceptible to the pharmacological effect and toxicity of the drug class of the test and reference articles. On the basis of the established procedures and previous study results, the female mouse is selected as the test system in this study.

Environmental Conditions
Housing Condition of Study Animals are Described in Following:
  Animals were individually housed in polycarbonate cages with bedding in Association for Assessment and Accreditation of Laboratory Animal Care International (AAALAC) certified facility. Temperature 20.7-23.1° C., Relative humidity 51.2-67.1%, Light cycle 12-hour light/12-hour dark cycle, Diet Autoclaved Rodent Diet 5010 (PMI® Nutrition International, Inc., MO, USA) was supplied ad libitum. Water ad libitum. Food and water are routinely analyzed. The results of food and water analyses are maintained in the archive of Testing Facility. No contaminants are expected to be present in food and water that would interfere with the outcome of this study.

Experimental Design
Animal Acclimation and Selection
  Animals were quarantined at the Testing Facility for 2 days and acclimated for between 3 and 4 days before dosing. At least one day before dosing, animals were randomly assigned to the study groups (Groups 1-12, each with two Subsets, A and B) in the proposed study design. A four-digit serial number was given to each assigned animal. There was no statistically significant (p<0.05) difference among the mean body weights of the study groups or study group subsets, as determined by one-way analysis of variance (ANOVA) or Kruskal-Wallis one-way ANOVA on ranks. Unassigned animals were designated as spare animals. Assigned animals would be replaced with spare animals if health issues [including body weight exceeding acceptable limit (24 g)] and/or suspected dosing errors arise on or before Day 0 of the respective batch. Collection of spare animal data was not performed after completion of the acclimation period. Spare animals were excluded from the study after Day 1.

Study Design
  Dose groups, nominal dose concentrations, dose volumes, nominal dose levels, and the number of animals per dose group are listed in the following Table 6:

TABLE 6

Study Design

| Group | Nominal Dose Concentration (U/mL)[a] | Dose Volume (mL/animal) | Nominal Dose Level (U/animal)[b] | Total Animals (F: Female) OBI-858 BOTOX® | |
|---|---|---|---|---|---|
| | | | | Subset A | Subset B |
| 1 | 0[c] | 0.02 | 0 | 10F | |
| 2 | 5 | 0.02 | 0.1 | 10F | 10F |
| 3 | 9 | 0.02 | 0.18 | 10F | 10F |
| 4 | 16 | 0.02 | 0.32 | 10F | 10F |
| 5 | 28.5 | 0.02 | 0.57 | 10F | 10F |
| 6 | 43 | 0.02 | 0.86 | 10F | 10F |
| 7 | 64 | 0.02 | 1.28 | 10F | 10F |

TABLE 6-continued

Study Design

| Group | Nominal Dose Concentration (U/mL)[a] | Dose Volume (mL/animal) | Nominal Dose Level (U/animal)[b] | Total Animals (F: Female) OBI-858 | BOTOX ® |
|---|---|---|---|---|---|
| 8 | 96.5 | 0.02 | 1.93 | 10F | 10F |
| 9 | 115.5 | 0.02 | 2.31 | 10F | 10F |
| 10 | 139 | 0.02 | 2.78 | 10F | 10F |
| 11 | 166.5 | 0.02 | 3.33 | 10F | 10F |
| 12 | 200 | 0.02 | 4 | 10F | 10F |
| 13 | 844,025 | 0.1 | 84,402.5 | 3F + 3F[d] | 0 |

[a]See Sec. 4.3.4 for information on the calculated dose concentration.
[b]Except for Group 13, the actual dose level is multiplied by dose volume.
[c]Dilution buffer was used for dosing of Group 1 (control) animals.
[d]Group 13 was for verification of test article integrity. Group 13 animals were selected from spare animals on dosing day.

Verification of Test Article Integrity

On the dosing day (Day 0) of each batch, 3 animals were randomly selected from the pool of spare animals. Separately, a single vial of test article was reconstituted (Stock 0), and a portion of Stock 0 was diluted 1.6-fold. The selected test animals were then intravenously injected via the tail vein with 0.1 mL of the reconstituted and diluted test article. Subsequent dosing of the main study animals would proceed when the test article integrity was confirmed by the deaths of at least two IV-dosed test animals within 1 hour post dose. If at least 2 animals failed to die within 1 hour, the particular vial of test article Stock 0 would have been discarded. In that event, fresh vial of Stock 0 was to be prepared from a second test article vial, with the verification test repeated with the stock of the second vial. If the second vial also failed the verification test, the dosing of the particular batch would have been stopped due to unacceptable test article potency. Since all test article vials passed the test, no follow-up procedures as described above took place after the initial tests.

Administration of Test Article: Intramuscular injection of the right gastrocnemius muscle.

Rationales for Selection of Dose Levels and Dosing Route

The nominal dose levels were selected by OBI in order to determine the intramuscular median effective dose (IM $ED_{50}$) and intramuscular median lethal dose (IM $LD_{50}$), which were expected to differ by one order.

Frequency of administrations: Single dose.

Administration of Negative Control

As negative control, 20 μL of diluent buffer was intramuscularly injected in the right gastrocnemius muscle of Group 1 dose animal. The procedures for control injection were identical to those of test article injection.

Observations and Examinations

Animals were observed for mortality once at least 6 hours post dose on Day 0. Thereafter animals were observed for mortality daily throughout the study period concurrent with conducting of DAS assay (up to Day 3). Mortality was individually scored and tallied on a per group basis for calculation of $LD_{50}$.

Digit Abduction Scoring (DAS) Assay

For each batch, study animals were observed for muscle weakness 24-26, 48-50, and 72-74 hours after the dosing of the first animal on Day 0 of respective batch. Muscle weakness was scored by DAS assay. For each animal, two individual personnel independently recorded the score of its muscle weakness. The two individually observed scores were averaged for analysis. The DAS assay was conducted as follows (excerpt from U.S. Patent Application Publication No. US 2010/0168023A1): The muscle paralysis was measured using digit abduction score (DAS) assay as reported by Aoki, K. R. in "A comparison of the safety margins of botulinum neurotoxin serotypes A, B, and F in mice", Toxicon 2001; 39 (12): 1815-1820. In the DAS assay, a mouse is briefly suspended by its tail to cause a characteristic startle response in which the mouse extends its hind limbs and abducts its hind digits. The extent to which the mouse is able to exhibit this startle response is scored on a five-point scale (from 0-4), with zero representing a normal startle response and four representing maximal reduction in digit abduction and leg extension. Scoring of digit abduction was based on the following Table 7:

TABLE 7

Digit abduction score (DAS) assay scoring

| Digit Abduction Score | | |
|---|---|---|
| 4 | Curved foot, 5 digits touching. Death | |
| 3 | Flat foot, 5 digits touching. Curved foot, 4 digits touching. | |
| 2 | Flat foot, slight space open at tips of all digits. Flat foot, 3 digits touching. | |
| 1 | Flat foot, a difference in the width of digits abduction compared to the noninjected leg. Flat foot, 2 digits touching and the rest spread completely. | |
| 0 | Normal (no change) | |

Animals that were dead at the time of DAS session were assigned the score "4" for the purpose of DAS assay.

Body Weight

Body weights were measured at least once for grouping and on Day 0 prior to dosing.

Statistical Analysis

Probit analysis was used for fitting probit and logit sigmoid toxin unit/DAS responses curves and for calculating IM $ED_{50}$ as well as IM $LD_{50}$ values. Analysis was performed using Minitab®. Safety margins of respective batches were calculated based on IM $ED_{50}$ (DAS) at 48 hours post dose and IM $LD_{50}$ at 72 hours post dose. The acceptance criteria for the regression analysis is $R^2 > 0.9$.

Computer System

Online data collection system, Pristima® (Version 6.3.2; Xybion Medical Systems Corporation) was used for the capture and analysis of body weight data in the Testing Facility.

Results and Discussion

Tests of OBI-858 RDS Batch Integrity

Summary of the OBI-858 integrity tests is presented in the following Table 8:

TABLE 8

OBI-858 integrity tests

| Batch | Batch-Vial No. | Mean Survival (minute post-dose) |
|---|---|---|
| 1 | 14004-25 | 34.0 ± 2.6 |
| 2 | 14004-30 | 33.3 ± 1.5 |
| 3 | 14004-35 | 34.7 ± 3.1 |
| 4 | 14004-45 | 31.7 ± 2.3 |

All vials of the test article passed the integrity test with mean post-dose survival less than 1 hour.

Body Weight

For each batch, the body weight ranges of individual dose groups were within ±10% of the respective mean weights.

DAS Assay and $ED_{50}$ Calculations
OBI-858

Animals exhibited signs of digit abduction as early as 24 hours post dose. The severity of digit abduction correlated to increasing dosage of OBI-858 RDS before plateauing at maximum severity (including death) at higher doses. For 48 h IM $ED_{50}$, all except Batch 1 passed the acceptance criteria ($R^2>0.9$) of the regression analysis. For Batches 2, 3, and 4, the $ED_{50}$ at 48 hours post dose are 0.33, 0.32, and 0.36 U/animal, respectively.

TABLE 9

Test Article OBI-858 $ED_{50}$ at 48 hours (U/animal)

| Batch | $ED_{50}$ | Low 95% | High 95% | $R^2$ value |
|---|---|---|---|---|
| 1 | 0.21 | 0.13 | 0.35 | 0.89 |
| 2 | 0.33 | 0.27 | 0.41 | 0.97 |
| 3 | 0.32 | 0.23 | 0.46 | 0.92 |
| 4 | 0.36 | 0.27 | 0.47 | 0.95 |

BOTOX®

Animals exhibited signs of digit abduction as early as 24 hours post dose. The severity of digit abduction correlated to increasing dosage of BOTOX® but the plateau of maximum severity (including death) was attained by BOTOX® at smaller doses than OBI-858 RDS. For 48 h IM $ED_{50}$, all except Batch 1 passed the acceptance criteria ($R^2>0.9$) of the regression analysis. For Batches 2, 3, and 4, the $ED_{50}$ at 48 hours post dose are 0.22, 0.24, and 0.23 U/animal, respectively. Overall, the 48 h IM $ED_{50}$ of BOTOX® are lower than that of OBI-858.

TABLE 10

BOTOX® $ED_{50}$ at 48 hours (U/animal)

| Batch | $ED_{50}$ | Low 95% | High 95% | $R^2$ value |
|---|---|---|---|---|
| 1 | 0.36 | 0.21 | 0.60 | 0.82 |
| 2 | 0.22 | 0.19 | 0.25 | 0.99 |
| 3 | 0.24 | 0.22 | 0.26 | 1.00 |
| 4 | 0.23 | 0.19 | 0.29 | 0.98 |

Mortalities and $LD_{50}$ Calculations
OBI-858

The majority of deaths took place at 72 hours post dose, although deaths were observed as early as 48 hours post dose among Groups 11 and 12 for some batches. At 72 hours post dose, $LD_{50}$ of all four batches were 3.00, 3.42, 3.33, and 3.35 U/animal, respectively. However, at 72 hours post dose only Batches 2, 3, and 4 had sufficient dose groups within the linear range of dose correlation for regression analysis, with the percentage dead between 0% and 100%. (At least three dose groups per analysis were required.) Among these three batches, only Batches 2 and 3 passed the acceptance criteria for the regression analysis.

TABLE 11

Test Article OBI-858 $LD_{50}$ at 72 hours (U/animal)

| Batch | $LD_{50}$ | Low 95% | High 95% | $R^2$ value |
|---|---|---|---|---|
| 1 | 3.00 | | | |
| 2 | 3.42 | 2.70 | 4.32 | 0.99 |
| 3 | 3.33 | 3.31 | 3.36 | 1.00 |
| 4 | 3.35 | 1.66 | 6.75 | 0.86 |

BOTOX®

Deaths took place among BOTOX®-dosed animals sooner (as early as 24 hours post dose) and at doses lower than those seen in OBI-858 RDS-dosed animals (Group 6 through Group 12 at 72 hours post dose). At 72 hours post dose, the calculated $LD_{50}$ of all four batches were 2.21, 1.63, 2.14, and 1.57 U/animal, respectively. However, none of the four batches of death rate outcomes passed the acceptance criteria for the regression analysis. For Batches 2, 3, and 4, there were no dose groups within the linear range of dose correlation at 72 hours post dose. Consequently, no regression analysis could be performed for the calculated $LD_{50}$ of these batches. For Batch 1, the R2 value was 0.74, below the acceptance criteria.

TABLE 12

BOTOX® $LD_{50}$ at 72 hours (U/animal)

| Batch | $LD_{50}$ | Low 95% | High 95% | $R^2$ value |
|---|---|---|---|---|
| 1 | 2.21 | 0.80 | 6.11 | 0.74 |
| 2 | 1.63 | | | |
| 3 | 2.14 | | | |
| 4 | 1.57 | | | |

Assessment of Impact of Body Weight Deviations on $ED_{50}$ Outcomes

For both OBI-858 RDS and BOTOX®, there was no consistent trend of differences in the calculated $ED_{50}$ between animals within the required body weight range (18-22 g) and animals overweight (greater than 22 g) at dosing. Exclusion of overweight animals from $ED_{50}$ calculations led to no consistent changes in $ED_{50}$ values, when compared to overall $ED_{50}$ values, as shown in the following Table 13:

TABLE 13

Comparison of IM 48 h $ED_{50}$ by Body Weight Range (U/animal)

| | OBI-858 | | | BOTOX® | | |
|---|---|---|---|---|---|---|
| Batch | 48 h IM $ED_{50}$ | 48 h IM $ED_{50}$ (Body Weight: 18-22 g) | 48 h IM $ED_{50}$ (Body Weight > 22 g) | 48 h IM $ED_{50}$ | 48 h IM $ED_{50}$ (Body Weight: 18-22 g) | 48 h IM $ED_{50}$ (Body Weight > 22 g) |
| 1 | 0.21 | 0.19 | 0.23 | 0.36 | 0.36 | 0.41 |
| 2 | 0.33 | 0.33 | 0.40 | 0.22 | 0.21 | 0.22 |
| 3 | 0.32 | 0.37 | 0.32 | 0.24 | 0.25 | 0.25 |
| 4 | 0.36 | 0.38 | 0.36 | 0.23 | 0.24 | 0.25 |

In addition, one animal was found to be underweight at 17.7 g at dosing (below the 18 g threshold). The underweight animal [ID 0193; Group 9, Subset B (Botox®); Batch 2] received similar Digital Abduction scores as the other animals in the same group in all scoring sessions. The event therefore had no impact on the study outcome.

Estimate of Margins of Safety (MOSs)

Safety margins are calculated as the ratio of 72 h IM $LD_{50}$ to 48 h IM $ED_{50}$.

For the four batches of tests, OBI-858 has the MOS values of 14.07, 10.32, 10.33, and 9.29, respectively. For the four batches of tests, BOTOX® has the MOS values of 6.20, 7.58, 8.98, and 6.73, respectively. The MOS of OBI-858 RDS is consistently higher than that of BOTOX® (Table 16).

CONCLUSION

All vials of OBI-858 tested in this study passed the integrity test. Elevated body weight (between 22 to 24 g) of some of the study animals at dosing had no significant impact on the outcomes of $ED_{50}$ calculations. For OBI-858, the respective 72 h IM $LD_{50}$ and 48 h IM $ED_{50}$ values for the acceptable batches are 3.42 and 0.33 U/animal (Batch 2) and 3.33 and 0.32 U/animal (Batch 3). The corresponding MOS values are 10.32 and 10.33 for Batch 2 and Batch 3, respectively. For BOTOX®, the respective 72 h IM $LD_{50}$ and 48 h IM ED 50 values are 1.63 and 0.22 U/animal (Batch 2) and 2.14 and 0.24 U/animal (Batch 3). The corresponding MOS values are 7.58 and 8.98 for Batch 2 and Batch 3, respectively. In short, OBI-858 has a potency comparable to that of BOTOX®. It has a higher 72 h IM $LD_{50}$ and safety margin value than BOTOX®.

TABLE 14

Test Article OBI-858 Mouse DAS Score at 48 hr by Body Weight Range

| Group (Dose Level (U/animal)) | Batch 1 | | Batch 2 | | Batch 3 | | Batch 4 | |
|---|---|---|---|---|---|---|---|---|
| | 18 ≤ BW ≤ 22 g (n) | >22 g (n) | 18 ≤ BW ≤ 22 g (n) | >22 g (n) | 18 ≤ BW ≤ 22 g (n) | >22 g (n) | 18 ≤ BW ≤ 22 g (n) | >22 g (n) |
| 1 (0.00) | 0.00 ± 0.00 (6) | 0.00 ± 0.00 (4) | 0.00 ± 0.00 (7) | 0.00 ± 0.00 (3) | 0.00 ± 0.00 (9) | 0.00 ± 0.00 (1) | 0.21 ± 0.43 (7) | 0.00 ± 0.00 (3) |
| 2 (0.10) | 1.39 ± 0.50 (9) | 1.00 ± 0.00 (1) | 0.90 ± 0.32 (5) | 0.40 ± 0.52 (5) | 0.33 ± 0.52 (3) | 1.00 ± 0.68 (7) | 0.80 ± 0.42 (5) | 0.90 ± 0.99 (5) |
| 3 (0.18) | 2.33 ± 0.78 (6) | 2.00 ± 0.76 (4) | 0.94 ± 0.44 (8) | 1.50 ± 0.58 (2) | 1.00 ± 0.69 (9) | 1.00 ± 0.00 (1) | 1.00 ± 0.67 (5) | 1.70 ± 1.06 (5) |
| 4 (0.32) | 2.44 ± 1.10 (9) | 2.00 ± 0.00 (1) | 2.17 ± 0.83 (6) | 1.88 ± 1.25 (4) | 2.92 ± 0.67 (6) | 2.13 ± 1.13 (4) | 1.71 ± 0.83 (7) | 1.83 ± 0.98 (3) |
| 5 (0.57) | 2.88 ± 1.31* (8) | 3.50 ± 0.71 (1) | 2.50 ± 0.85 (5) | 2.90 ± 0.57 (5) | 2.80 ± 0.79 (5) | 2.90 ± 1.10 (5) | 2.40 ± 0.52 (5) | 2.80 ± 0.42 (5) |
| 6 (0.86) | 3.44 ± 0.51 (8) | 3.25 ± 0.50 (2) | 3.43 ± 0.65 (7) | 3.17 ± 0.41 (3) | 3.42 ± 0.51 (6) | 3.63 ± 0.52 (4) | 3.08 ± 0.79 (6) | 2.63 ± 0.92 (4) |
| 7 (1.28) | 4.00 ± 0.00 (6) | 3.88 ± 0.35 (4) | 3.17 ± 0.75 (3) | 3.29 ± 0.47 (7) | 3.25 ± 0.46 (4) | 3.25 ± 0.45 (6) | 3.14 ± 0.53 (7) | 3.17 ± 0.75 (3) |
| 8 (1.93) | 4.00 ± 0.00 (8) | 3.75 ± 0.50 (2) | 3.75 ± 0.45 (6) | 4.00 ± 0.00 (4) | 3.58 ± 0.51 (6) | 3.38 ± 0.52 (4) | 3.57 ± 0.51 (7) | 2.83 ± 0.75 (3) |
| 9 (2.31) | 3.78 ± 0.43 (9) | 4.00 ± 0.00 (1) | 4.00 ± 0.00 (9) | 3.00 ± 0.00 (1) | 3.50 ± 0.52 (6) | 3.75 ± 0.46 (4) | 3.75 ± 0.46 (4) | 3.50 ± 0.52 (6) |
| 10 (2.78) | 3.92 ± 0.29 (6) | 4.00 ± 0.00 (4) | 4.00 ± 0.00 (8) | 4.00 ± 0.00 (2) | 3.90 ± 0.32 (5) | 3.80 ± 0.42 (5) | 4.00 ± 0.00 (6) | 3.75 ± 0.46 (4) |
| 11 (3.33) | 4.00 ± 0.00 (6) | 4.00 ± 0.00 (4) | 4.00 ± 0.00 (8) | 4.00 ± 0.00 (2) | 3.90 ± 0.32 (5) | 4.00 ± 0.00 (5) | 4.00 ± 0.00 (8) | 4.00 ± 0.00 (2) |
| 12 (4.00) | 4.00 ± 0.00 (8) | 4.00 ± 0.00 (2) | 4.00 ± 0.00 (7) | 4.00 ± 0.00 (3) | 4.00 ± 0.00 (8) | 4.00 ± 0.00 (2) | 4.00 ± 0.00 (7) | 4.00 ± 0.00 (3) |

*One animal was dead during procedure; the incident was unrelated to test article effect. The animal was excluded from DAS assay at 48 hours.

TABLE 15

Botox ® Mouse DAS Score at 48 hr by Body Weight Range

| Group (Dose Level (U/animal)) | Batch 1 | | Batch 2 | | Batch 3 | | Batch 4 | |
|---|---|---|---|---|---|---|---|---|
| | 18 ≤ BW ≤ 22 g (n) | >22 g (n) | 18 ≤ BW ≤ 22 g (n) | >22 g (n) | 18 ≤ BW ≤ 22 g (n) | >22 g (n) | 18 ≤ BW ≤ 22 g (n) | >22 g (n) |
| 1 (0.00) | 0.00 ± 0.00 (6) | 0.00 ± 0.00 (4) | 0.00 ± 0.00 (7) | 0.00 ± 0.00 (3) | 0.00 ± 0.00 (9) | 0.00 ± 0.00 (1) | 0.21 ± 0.43 (7) | 0.00 ± 0.00 (3) |
| 2 (0.10) | 1.39 ± 0.50 (9) | 1.00 ± 0.00 (1) | 0.90 ± 0.32 (5) | 0.40 ± 0.52 (5) | 0.33 ± 0.52 (3) | 1.00 ± 0.68 (7) | 0.80 ± 0.42 (5) | 0.90 ± 0.99 (5) |
| 3 (0.18) | 2.33 ± 0.78 (6) | 2.00 ± 0.76 (4) | 0.94 ± 0.44 (8) | 1.50 ± 0.58 (2) | 1.00 ± 0.69 (9) | 1.00 ± 0.00 (1) | 1.00 ± 0.67 (5) | 1.70 ± 1.06 (5) |
| 4 (0.32) | 2.44 ± 1.10 (9) | 2.00 ± 0.00 (1) | 2.17 ± 0.83 (6) | 1.88 ± 1.25 (4) | 2.92 ± 0.67 (6) | 2.13 ± 1.13 (4) | 1.71 ± 0.83 (7) | 1.83 ± 0.98 (3) |
| 5 (0.57) | 2.88 ± 1.31* (8) | 3.50 ± 0.71 (1) | 2.50 ± 0.85 (5) | 2.90 ± 0.57 (5) | 2.80 ± 0.79 (5) | 2.90 ± 1.10 (5) | 2.40 ± 0.52 (5) | 2.80 ± 0.42 (5) |
| 6 (0.86) | 3.44 ± 0.51 (8) | 3.25 ± 0.50 (2) | 3.43 ± 0.65 (7) | 3.17 ± 0.41 (3) | 3.42 ± 0.51 (6) | 3.63 ± 0.52 (4) | 3.08 ± 0.79 (6) | 2.63 ± 0.92 (4) |

TABLE 15-continued

Botox ® Mouse DAS Score at 48 hr by Body Weight Range

| Group | Batch 1 | | Batch 2 | | Batch 3 | | Batch 4 | |
|---|---|---|---|---|---|---|---|---|
| (Dose Level (U/animal)) | 18 ≤ BW ≤ 22 g (n) | >22 g (n) | 18 ≤ BW ≤ 22 g (n) | >22 g (n) | 18 ≤ BW ≤ 22 g (n) | >22 g (n) | 18 ≤ BW ≤ 22 g (n) | >22 g (n) |
| 7 (1.28) | 4.00 ± 0.00 (6) | 3.88 ± 0.35 (4) | 3.17 ± 0.75 (3) | 3.29 ± 0.47 (7) | 3.25 ± 0.46 (4) | 3.25 ± 0.45 (6) | 3.14 ± 0.53 (7) | 3.17 ± 0.75 (3) |
| 8 (1.93) | 4.00 ± 0.00 (8) | 3.75 ± 0.50 (2) | 3.75 ± 0.45 (6) | 4.00 ± 0.00 (4) | 3.58 ± 0.51 (6) | 3.38 ± 0.52 (4) | 3.57 ± 0.51 (7) | 2.83 ± 0.75 (3) |
| 9 (2.31) | 3.69 ± 0.48 (8) | 3.75 ± 0.50 (2) | 4.00 ± 0.00 (4) | 4.00 ± 0.00 (6) | 4.00 ± 0.00 (4) | 4.00 ± 0.00 (6) | 4.00 ± 0.00 (8) | 4.00 ± 0.00 (2) |
| 10 (2.78) | 3.61 ± 0.50 (9) | 3.00 ± 0.00 (1) | 4.00 ± 0.00 (5) | 4.00 ± 0.00 (5) | 4.00 ± 0.00 (5) | 4.00 ± 0.00 (5) | 4.00 ± 0.00 (5) | 4.00 ± 0.00 (5) |
| 11 (3.33) | 4.00 ± 0.00 (8) | 4.00 ± 0.00 (2) | 4.00 ± 0.00 (7) | 4.00 ± 0.00 (3) | 4.00 ± 0.00 (7) | 4.00 ± 0.00 (3) | 4.00 ± 0.00 (8) | 4.00 ± 0.00 (2) |
| 12 (4.00) | 4.00 ± 0.00 (6) | 4.00 ± 0.00 (4) | 4.00 ± 0.00 (7) | 4.00 ± 0.00 (3) | 4.00 ± 0.00 (5) | 4.00 ± 0.00 (5) | 4.00 ± 0.00 (9) | 4.00 ± 0.00 (1) |

TABLE 16

The safety margin value of OBI-858 and BOTOX ®

| Batch | OBI-858 | BOTOX ® |
|---|---|---|
| 1 | 14.07 | 6.20 |
| 2 | 10.32 | 7.58 |
| 3 | 10.33 | 8.98 |
| 4 | 9.29 | 6.73 |

Example 4: The Stability Test of OBI-858 Formulation

Experimental Material/Method:
(1) LF08 Formulation:
0.5 mg/mL Human Serum Albumin (HSA), 11.25 mg/mL sodium chloride, and 0.188 mg/mL Polysorbate 80 dissolved in 50 mM phosphate buffer (pH 6.3).
(2) LF09 Formulation:
0.5 mg/mL Human Serum Albumin (HSA), 11.25 mg/mL sodium chloride, and 0.188 mg/mL Polysorbate 80 dissolved in 50 mM Citric acid (Sodium Citrate) buffer (pH 5.6).
(3) LF10 Formulation:
0.5 mg/mL Methionine, 11.25 mg/mL sodium chloride, 0.188 mg/mL Polysorbate 80 and 150 mM Arginine dissolved in 50 mM Citric acid (Sodium Citrate) buffer (pH 6.0).
(4) LF11 Formulation:
11.25 mg/mL sodium chloride and 0.188 mg/mL Polysorbate dissolved in 50 mM Citric acid (Sodium Citrate) buffer (pH 6.3).
(5) Experimental Animal:
Eight female ICR mice (Body weight range: 18-22 g). The selected test animals were then intravenously injected via the tail vein with 0.1 mL of OBI-858 to test lethal dose ($LD_{50}$/mL).
Experimental Result:
(1) Stability Test Between Different Formulations:
Lyophilized OBI-858 DS powder was reconstituted within four formulations. After stored in 45° C. for fourteen days, these test articles were transferred to 4° C. for twenty-four hours. The selected test animals were then intravenously injected via the tail after warming up in room temperature for 1 hour. Table 17 showed the lethal dose ($LD_{50}$/mL) of these four formulations. It indicated that the best stability existed in LF09 formulation.

TABLE 17

Stability test between different formulations

| | Formulation | | | |
|---|---|---|---|---|
| | LF08 | LF09 | LF10 | LF11 |
| lethal dose before test ($LD_{50}$/mL) | 6.15E+05 | 8.12E+05 | 6.75E+05 | 1.63E+05 |
| Test temperature | 45° C. | | | |
| Test time | 14 Days | | | |
| lethal dose after test ($LD_{50}$/mL) | 0 | 2.58E+05 | 0 | 0 |

(2) 4-60° C. Accelerated Stability Test of LF09 Formulation:
Lyophilized OBI-858 DS powder was reconstituted within LF09 formulation. After stored in four temperatures (4° C., 25° C., 45° C., and 60° C.) for seven days, these test articles were transferred to 4° C. for twenty-four hours these test articles were transferred to 4° C. for twenty-four hours. The selected test animals were then intravenously injected via the tail after warming up in room temperature for 1 hour. Table 18 showed the lethal dose ($LD_{50}$/mL) of LF09 formulation. It indicated that the stability still existed in storage within 45° C.

TABLE 18 accelerated stability test of LF09 formulation

| | Test temperature 4° C. | 25° C. | 45° C. | 60° C. |
|---|---|---|---|---|
| lethal dose before test ($LD_{50}$/mL) | 5.07E+05 | 5.07E+05 | 5.07E+05 | 5.07E+05 |
| Test time | | 7 Days | | |
| lethal dose after test ($LD_{50}$/mL) | 5.07E+05 | 5.07E+05 | 4.06E+05 | 0 |

It should be understood that the exemplary embodiments described herein should be considered in a descriptive sense only and not for the purpose of limitation. It should generally be considered that the description of features or aspects within each exemplary embodiment can be used for other similar features or aspects in other exemplary embodiments. Although one or more exemplary embodiments have been described with reference to the accompanying drawings, those of ordinary skill in the art should understand that they can be carried out without departing from the spirit and scope of the inventive concept as defined by the appended claims various changes in form and detail.

The invention claimed is:

1. A pharmaceutical composition comprising a *Clostridium botulinum* toxin Type A complex and a formulation buffer comprising human serum albumin, sodium chloride and polysorbate 80 dissolved in citrate buffer, wherein the *Clostridium botulinum* toxin Type A complex comprises:
 a HA70 component comprising the amino acid sequence of SEQ ID NO. 1;
 a HA17 component comprising the amino acid sequence of SEQ ID NO. 2;
 a HA33 component comprising the amino acid sequence of SEQ ID NO. 3;
 a NTNH component comprising the amino acid sequence of SEQ ID NO. 4;
 a BoNT/A1 component comprising the amino acid sequence of SEQ ID NO. 5; and
 wherein the *Clostridium botulinum* toxin Type A complex has a molecular weight of 740-790 kDa.

2. The pharmaceutical composition of claim 1, wherein the pharmaceutical composition is in a lyophilized form.

3. The pharmaceutical composition of claim 1, wherein the formulation buffer comprises 0.1-1 mg/mL of human serum albumin, 5-20 mg/mL of sodium chloride, and 0.1-0.3 mg/mL of polysorbate 80 dissolved in 50 mM of citrate buffer.

4. The pharmaceutical composition of claim 1, wherein the formulation buffer has a pH value range from 4-8.

5. A liquid formulation comprising the pharmaceutical composition of claim 1 in a dilution buffer, wherein the liquid formulation is formulated for intradermal or intramuscular injection.

* * * * *

SEQUENCE LISTING

<160> NUMBER OF SEQ ID NOS: 5

<210> SEQ ID NO 1
<211> LENGTH: 626
<212> TYPE: PRT
<213> ORGANISM: Clostridium botulinum

<400> SEQUENCE: 1

Met Asn Ser Ser Ile Lys Lys Ile Tyr Asn Asp Ile Gln Glu Lys Val
1               5                   10                  15

Ile Asn Tyr Ser Asp Thr Ile Asp Leu Ala Asp Gly Asn Tyr Val Val
            20                  25                  30

Arg Arg Gly Asp Gly Trp Ile Leu Ser Arg Gln Asn Gln Ile Leu Gly
        35                  40                  45

Gly Ser Val Ile Ser Asn Gly Ser Thr Gly Ile Val Gly Asp Leu Arg
    50                  55                  60

Val Asn Asp Asn Ala Ile Pro Tyr Tyr Tyr Pro Thr Pro Ser Phe Asn
65                  70                  75                  80

Glu Glu Tyr Ile Lys Asn Asn Ile Gln Thr Val Phe Thr Asn Phe Thr
                85                  90                  95

Glu Ala Asn Gln Ile Pro Ile Gly Phe Glu Phe Ser Lys Thr Ala Pro
            100                 105                 110

Ser Asn Lys Asn Leu Tyr Met Tyr Leu Gln Tyr Thr Tyr Ile Arg Tyr
        115                 120                 125

Glu Ile Ile Lys Val Leu Gln His Glu Ile Ile Glu Arg Ala Val Leu
130                 135                 140

Tyr Val Pro Ser Leu Gly Tyr Val Lys Ser Ile Glu Phe Asn Pro Gly
145                 150                 155                 160

Glu Lys Ile Asn Lys Asp Phe Tyr Phe Leu Thr Asn Asp Lys Cys Ile
                165                 170                 175

Leu Asn Glu Gln Phe Leu Tyr Lys Lys Ile Leu Glu Thr Thr Lys Asn
            180                 185                 190

Ile Pro Thr Asn Asn Ile Phe Asn Ser Lys Val Ser Ser Thr Gln Arg
        195                 200                 205

Val Leu Pro Tyr Ser Asn Gly Leu Tyr Val Ile Asn Lys Gly Asp Gly
    210                 215                 220

Tyr Ile Arg Thr Asn Asp Lys Asp Leu Ile Gly Thr Leu Leu Ile Glu
225                 230                 235                 240

Ala Gly Ser Ser Gly Ser Ile Ile Gln Pro Arg Leu Arg Asn Thr Thr
                245                 250                 255

Arg Pro Leu Phe Thr Thr Ser Asn Asp Thr Lys Phe Ser Gln Gln Tyr
            260                 265                 270

Thr Glu Glu Arg Leu Lys Asp Ala Phe Asn Val Gln Leu Phe Asn Thr
        275                 280                 285

Ser Thr Ser Leu Phe Lys Phe Val Glu Glu Ala Pro Ser Asp Lys Asn
    290                 295                 300

Ile Cys Ile Lys Ala Tyr Asn Thr Tyr Glu Lys Tyr Glu Leu Ile Asp
305                 310                 315                 320

Tyr Gln Asn Gly Ser Ile Val Asn Lys Ala Glu Tyr Tyr Leu Pro Ser
                325                 330                 335

Leu Gly Tyr Cys Glu Val Thr Asn Ala Pro Ser Pro Glu Ser Glu Val
            340                 345                 350

Val Lys Met Gln Val Ala Glu Asp Gly Phe Ile Gln Asn Gly Pro Glu
        355                 360                 365

Glu Glu Ile Val Val Gly Val Ile Asp Pro Ser Glu Asn Ile Gln Glu
       370                 375                 380
Ile Asn Thr Ala Ile Ser Asp Asn Tyr Thr Tyr Asn Ile Pro Gly Ile
385                 390                 395                 400
Val Asn Asn Asn Pro Phe Tyr Ile Leu Phe Thr Val Asn Thr Thr Gly
                405                 410                 415
Ile Tyr Lys Ile Asn Ala Gln Asn Asn Leu Pro Ser Leu Lys Ile Tyr
            420                 425                 430
Glu Ala Ile Gly Ser Gly Asn Arg Asn Phe Gln Ser Gly Asn Leu Cys
        435                 440                 445
Asp Asp Asp Ile Lys Ala Ile Asn Tyr Ile Thr Gly Phe Asp Ser Pro
450                 455                 460
Asn Ala Lys Ser Tyr Leu Val Val Leu Leu Asn Lys Asp Lys Asn Tyr
465                 470                 475                 480
Tyr Ile Arg Val Pro Gln Thr Ser Ser Asn Ile Glu Asn Gln Ile Gln
                485                 490                 495
Phe Lys Arg Glu Glu Gly Asp Leu Arg Asn Leu Met Asn Ser Ser Val
            500                 505                 510
Asn Ile Ile Asp Asn Leu Asn Ser Thr Gly Ala His Tyr Tyr Thr Arg
        515                 520                 525
Gln Ser Pro Asp Val His Asp Tyr Ile Ser Tyr Glu Phe Thr Ile Pro
530                 535                 540
Gly Asn Phe Asn Asn Lys Asp Thr Ser Asn Ile Arg Leu Tyr Thr Ser
545                 550                 555                 560
Tyr Asn Gln Gly Ile Gly Thr Leu Phe Arg Val Thr Glu Thr Ile Asp
                565                 570                 575
Gly Tyr Asn Leu Ile Asn Ile Gln Gln Asn Leu His Leu Leu Asn Asn
            580                 585                 590
Thr Asn Ser Ile Arg Leu Leu Asn Gly Ala Ile Tyr Ile Leu Lys Val
        595                 600                 605
Glu Val Thr Glu Leu Asn Asn Tyr Asn Ile Arg Leu His Ile Asp Ile
    610                 615                 620
Thr Asn
625

<210> SEQ ID NO 2
<211> LENGTH: 146
<212> TYPE: PRT
<213> ORGANISM: Clostridium botulinum

<400> SEQUENCE: 2

Met Ser Val Glu Arg Thr Phe Leu Pro Asn Gly Asn Tyr Asn Ile Lys
1               5                   10                  15
Ser Ile Phe Ser Gly Ser Leu Tyr Leu Asn Pro Val Ser Lys Ser Leu
            20                  25                  30
Thr Phe Ser Asn Glu Ser Ser Ala Asn Gln Lys Trp Asn Val Glu
        35                  40                  45
Tyr Met Ala Glu Asn Arg Cys Phe Lys Ile Ser Asn Val Ala Glu Pro
    50                  55                  60
Asn Lys Tyr Leu Ser Tyr Asp Asn Phe Gly Phe Ile Ser Leu Asp Ser
65                  70                  75                  80
Leu Ser Asn Arg Cys Tyr Trp Phe Pro Ile Lys Ile Ala Val Asn Thr
                85                  90                  95
Tyr Ile Met Leu Ser Leu Asn Lys Val Asn Glu Leu Asp Tyr Ala Trp
            100                 105                 110

```
Asp Ile Tyr Asp Thr Asn Glu Asn Ile Leu Ser Gln Pro Leu Leu Leu
            115                 120                 125

Leu Pro Asn Phe Asp Ile Tyr Asn Ser Asn Gln Met Phe Lys Leu Glu
        130                 135                 140

Lys Ile
145

<210> SEQ ID NO 3
<211> LENGTH: 293
<212> TYPE: PRT
<213> ORGANISM: Clostridium botulinum

<400> SEQUENCE: 3

Met Glu His Tyr Ser Val Ile Gln Asn Ser Leu Asn Asp Lys Ile Val
1               5                   10                  15

Thr Ile Ser Cys Lys Ala Asp Thr Asn Leu Phe Phe Tyr Gln Val Ala
            20                  25                  30

Gly Asn Val Ser Leu Phe Gln Gln Thr Arg Asn Tyr Leu Glu Arg Trp
        35                  40                  45

Arg Leu Ile Tyr Asp Ser Asn Lys Ala Ala Tyr Lys Ile Lys Ser Met
    50                  55                  60

Asp Ile His Asn Thr Asn Leu Val Leu Thr Trp Asn Ala Pro Thr His
65                  70                  75                  80

Asn Ile Ser Thr Gln Gln Asp Ser Asn Ala Asp Asn Gln Tyr Trp Leu
                85                  90                  95

Leu Leu Lys Asp Ile Gly Asn Asn Ser Phe Ile Ile Ala Ser Tyr Lys
            100                 105                 110

Asn Pro Asn Leu Val Leu Tyr Ala Asp Thr Val Ala Arg Asn Leu Lys
        115                 120                 125

Leu Ser Thr Leu Asn Asn Ser Asn Tyr Ile Lys Phe Ile Ile Glu Asp
    130                 135                 140

Tyr Ile Ile Ser Asp Leu Asn Asn Phe Thr Cys Lys Ile Ser Pro Ile
145                 150                 155                 160

Leu Asp Leu Asn Lys Val Val Gln Gln Val Asp Val Thr Asn Leu Asn
                165                 170                 175

Val Asn Leu Tyr Thr Trp Asp Tyr Gly Arg Asn Gln Lys Trp Thr Ile
            180                 185                 190

Arg Tyr Asn Glu Glu Lys Ala Ala Tyr Gln Phe Phe Asn Thr Ile Leu
        195                 200                 205

Ser Asn Gly Val Leu Thr Trp Ile Phe Ser Asn Gly Asn Thr Val Arg
    210                 215                 220

Val Ser Ser Ser Asn Asp Gln Asn Asn Asp Ala Gln Tyr Trp Leu Ile
225                 230                 235                 240

Asn Pro Val Ser Asp Thr Asp Glu Thr Tyr Thr Ile Thr Asn Leu Arg
                245                 250                 255

Asp Thr Thr Lys Ala Leu Asp Leu Tyr Gly Gly Gln Thr Ala Asn Gly
            260                 265                 270

Thr Ala Ile Gln Val Phe Asn Tyr His Gly Asp Asp Asn Gln Lys Trp
        275                 280                 285

Asn Ile Arg Asn Pro
        290

<210> SEQ ID NO 4
<211> LENGTH: 1193
<212> TYPE: PRT
```

<213> ORGANISM: Clostridium botulinum

<400> SEQUENCE: 4

```
Met Asn Ile Asn Asp Asn Leu Ser Ile Asn Ser Pro Val Asp Asn Lys
1               5                   10                  15

Asn Val Val Val Arg Ala Arg Lys Thr Asp Thr Val Phe Lys Ala
            20                  25                  30

Phe Lys Val Ala Pro Asn Ile Trp Val Ala Pro Glu Arg Tyr Tyr Gly
            35                  40                  45

Glu Ser Leu Ser Ile Asp Glu Tyr Lys Val Asp Gly Gly Ile Tyr
        50                  55                  60

Asp Ser Asn Phe Leu Ser Gln Asp Ser Glu Lys Asp Lys Phe Leu Gln
65                  70                  75                  80

Ala Ile Ile Thr Leu Leu Lys Arg Ile Asn Ser Thr Asn Ala Gly Glu
                85                  90                  95

Lys Leu Leu Ser Leu Ile Ser Thr Ala Ile Pro Phe Pro Tyr Gly Tyr
                100                 105                 110

Ile Gly Gly Gly Tyr Tyr Ala Pro Asn Met Ile Thr Phe Gly Ser Ala
            115                 120                 125

Pro Lys Ser Asn Lys Lys Leu Asn Ser Leu Ile Ser Ser Thr Ile Pro
    130                 135                 140

Phe Pro Tyr Ala Gly Tyr Arg Glu Thr Asn Tyr Leu Ser Ser Glu Asp
145                 150                 155                 160

Asn Lys Ser Phe Tyr Ala Ser Asn Ile Val Ile Phe Gly Pro Gly Ala
                165                 170                 175

Asn Ile Val Glu Asn Asn Thr Val Phe Tyr Lys Lys Glu Asp Ala Glu
            180                 185                 190

Asn Gly Met Gly Thr Met Thr Glu Ile Trp Phe Gln Pro Phe Leu Thr
        195                 200                 205

Tyr Lys Tyr Asp Glu Phe Tyr Ile Asp Pro Ala Ile Glu Leu Ile Lys
    210                 215                 220

Cys Leu Ile Lys Ser Leu Tyr Phe Leu Tyr Gly Ile Lys Pro Ser Asp
225                 230                 235                 240

Asp Leu Val Ile Pro Tyr Arg Leu Arg Ser Glu Leu Glu Asn Ile Glu
                245                 250                 255

Tyr Ser Gln Leu Asn Ile Val Asp Leu Leu Val Ser Gly Gly Ile Asp
            260                 265                 270

Pro Lys Phe Ile Asn Thr Asp Pro Tyr Trp Phe Thr Asp Asn Tyr Phe
        275                 280                 285

Ser Asn Ala Lys Lys Val Phe Glu Asp His Arg Asn Ile Tyr Glu Thr
290                 295                 300

Glu Ile Glu Gly Asn Asn Ala Ile Gly Asn Asp Ile Lys Leu Arg Leu
305                 310                 315                 320

Lys Gln Lys Phe Arg Ile Asn Ile Asn Asp Ile Trp Glu Leu Asn Leu
                325                 330                 335

Asn Tyr Phe Ser Lys Glu Phe Ser Ile Met Met Pro Asp Arg Phe Asn
            340                 345                 350

Asn Ala Leu Lys His Phe Tyr Arg Lys Gln Tyr Tyr Lys Ile Asp Tyr
        355                 360                 365

Pro Glu Asn Tyr Ser Ile Asn Gly Phe Val Asn Gly Gln Ile Asn Ala
    370                 375                 380

Gln Leu Ser Leu Ser Asp Arg Asn Gln Asp Ile Ile Asn Lys Pro Glu
385                 390                 395                 400
```

-continued

Glu Ile Ile Asn Leu Leu Asn Gly Asn Asn Val Ser Leu Met Arg Ser
            405                 410                 415

Asn Ile Tyr Gly Asp Gly Leu Lys Ser Thr Val Asp Asp Phe Tyr Ser
        420                 425                 430

Asn Tyr Lys Ile Pro Tyr Asn Arg Ala Tyr Glu Tyr His Phe Asn Asn
            435                 440                 445

Ser Asn Asp Ser Ser Leu Asp Asn Val Asn Ile Gly Val Ile Asp Asn
450                 455                 460

Ile Pro Glu Ile Ile Asp Val Asn Pro Tyr Lys Glu Asn Cys Asp Lys
465                 470                 475                 480

Phe Ser Pro Val Gln Lys Ile Thr Ser Thr Arg Glu Ile Asn Thr Asn
            485                 490                 495

Ile Pro Trp Pro Ile Asn Tyr Leu Gln Ala Gln Asn Thr Asn Asn Glu
            500                 505                 510

Lys Phe Ser Leu Ser Ser Asp Phe Val Glu Val Val Ser Ser Lys Asp
            515                 520                 525

Lys Ser Leu Val Tyr Ser Phe Leu Ser Asn Val Met Phe Tyr Leu Asp
        530                 535                 540

Ser Ile Lys Asp Asn Ser Pro Ile Asp Thr Asp Lys Lys Tyr Tyr Leu
545                 550                 555                 560

Trp Leu Arg Glu Ile Phe Arg Asn Tyr Ser Phe Asp Ile Thr Ala Thr
                565                 570                 575

Gln Glu Ile Asn Thr Asn Cys Gly Ile Asn Lys Val Val Thr Trp Phe
            580                 585                 590

Gly Lys Ala Leu Asn Ile Leu Asn Thr Ser Asp Ser Phe Val Glu Glu
        595                 600                 605

Phe Gln Asn Leu Gly Ala Ile Ser Leu Ile Asn Lys Lys Glu Asn Leu
            610                 615                 620

Ser Met Pro Ile Ile Glu Ser Tyr Glu Ile Pro Asn Asp Met Leu Gly
625                 630                 635                 640

Leu Pro Leu Asn Asp Leu Asn Glu Lys Leu Phe Asn Ile Tyr Ser Lys
                645                 650                 655

Asn Thr Ala Tyr Phe Lys Lys Ile Tyr Tyr Asn Phe Leu Asp Gln Trp
            660                 665                 670

Trp Thr Gln Tyr Tyr Ser Gln Tyr Phe Asp Leu Ile Cys Met Ala Lys
        675                 680                 685

Arg Ser Val Leu Ala Gln Glu Thr Leu Ile Lys Arg Ile Ile Gln Lys
        690                 695                 700

Lys Leu Ser Tyr Leu Ile Gly Asn Ser Asn Ile Ser Ser Asp Asn Leu
705                 710                 715                 720

Ala Leu Met Asn Leu Thr Thr Thr Asn Thr Leu Arg Asp Ile Ser Asn
                725                 730                 735

Glu Ser Gln Ile Ala Met Asn Asn Val Asp Ser Phe Leu Asn Asn Ala
            740                 745                 750

Ala Ile Cys Val Phe Glu Ser Asn Ile Tyr Pro Lys Phe Ile Ser Phe
        755                 760                 765

Met Glu Gln Cys Ile Asn Asn Ile Asn Ile Lys Thr Lys Glu Phe Ile
    770                 775                 780

Gln Lys Cys Thr Asn Ile Asn Glu Asp Glu Lys Leu Gln Leu Ile Asn
785                 790                 795                 800

Gln Asn Val Phe Asn Ser Leu Asp Phe Glu Phe Leu Asn Ile Gln Asn
                805                 810                 815

Met Lys Ser Leu Phe Ser Ser Glu Thr Ala Leu Leu Ile Lys Glu Glu

```
                   820             825                  830
Thr Trp Pro Tyr Glu Leu Val Leu Tyr Ala Phe Lys Glu Pro Gly Asn
            835                  840                 845
Asn Val Ile Gly Asp Ala Ser Gly Lys Asn Thr Ser Ile Glu Tyr Ser
850                 855                 860
Lys Asp Ile Gly Leu Val Tyr Gly Ile Asn Ser Asp Ala Leu Tyr Leu
865                 870                 875                 880
Asn Gly Ser Asn Gln Ser Ile Ser Phe Ser Asn Asp Phe Phe Glu Asn
            885                 890                 895
Gly Leu Thr Asn Ser Phe Ser Ile Tyr Phe Trp Leu Arg Asn Leu Gly
            900                 905                 910
Lys Asp Thr Ile Lys Ser Lys Leu Ile Gly Ser Lys Glu Asp Asn Cys
            915                 920                 925
Gly Trp Glu Ile Tyr Phe Gln Asp Thr Gly Leu Val Phe Asn Met Ile
            930                 935                 940
Asp Ser Asn Gly Asn Glu Lys Asn Ile Tyr Leu Ser Asp Val Ser Asn
945                 950                 955                 960
Asn Ser Trp His Tyr Ile Thr Ile Ser Val Asp Arg Leu Lys Glu Gln
            965                 970                 975
Leu Leu Ile Phe Ile Asp Asp Asn Leu Val Ala Asn Glu Ser Ile Lys
            980                 985                 990
Glu Ile Leu Asn Ile Tyr Ser Ser  Asn Ile Ile Ser Leu  Leu Ser Glu
            995                  1000                1005
Asn Asn  Pro Ser Tyr Ile Glu  Gly Leu Thr Ile Leu  Asn Lys Pro
    1010                 1015                 1020
Thr Thr  Ser Gln Glu Val Leu  Ser Asn Tyr Phe Glu  Val Leu Asn
    1025                 1030                 1035
Asn Ser  Tyr Ile Arg Asp Ser  Asn Glu Glu Arg Leu  Glu Tyr Asn
    1040                 1045                 1050
Lys Thr  Tyr Gln Leu Tyr Asn  Tyr Val Phe Ser Asp  Lys Pro Ile
    1055                 1060                 1065
Cys Glu  Val Lys Gln Asn Asn  Asn Ile Tyr Leu Thr  Ile Asn Asn
    1070                 1075                 1080
Thr Asn  Asn Leu Asn Leu Gln  Ala Ser Lys Phe Lys  Leu Leu Ser
    1085                 1090                 1095
Ile Asn  Pro Asn Lys Gln Tyr  Val Gln Lys Leu Asp  Glu Val Ile
    1100                 1105                 1110
Ile Ser  Val Leu Asp Asn Met  Glu Lys Tyr Ile Asp  Ile Ser Glu
    1115                 1120                 1125
Asp Asn  Arg Leu Gln Leu Ile  Asp Asn Lys Asn Asn  Ala Lys Lys
    1130                 1135                 1140
Met Ile  Ile Ser Asn Asp Ile  Phe Ile Ser Asn Cys  Leu Thr Leu
    1145                 1150                 1155
Ser Tyr  Asn Gly Lys Tyr Ile  Cys Leu Ser Met Lys  Asp Glu Asn
    1160                 1165                 1170
His Asn  Trp Met Ile Cys Asn  Asn Asp Met Ser Lys  Tyr Leu Tyr
    1175                 1180                 1185
Leu Trp  Ser Phe Lys
    1190

<210> SEQ ID NO 5
<211> LENGTH: 1296
<212> TYPE: PRT
<213> ORGANISM: Clostridium botulinum
```

<400> SEQUENCE: 5

```
Met Pro Phe Val Asn Lys Gln Phe Asn Tyr Lys Asp Pro Val Asn Gly
1               5                   10                  15

Val Asp Ile Ala Tyr Ile Lys Ile Pro Asn Ala Gly Gln Met Gln Pro
            20                  25                  30

Val Lys Ala Phe Lys Ile His Asn Lys Ile Trp Val Ile Pro Glu Arg
        35                  40                  45

Asp Thr Phe Thr Asn Pro Glu Glu Gly Asp Leu Asn Pro Pro Pro Glu
    50                  55                  60

Ala Lys Gln Val Pro Val Ser Tyr Tyr Asp Ser Thr Tyr Leu Ser Thr
65                  70                  75                  80

Asp Asn Glu Lys Asp Asn Tyr Leu Lys Gly Val Thr Lys Leu Phe Glu
                85                  90                  95

Arg Ile Tyr Ser Thr Asp Leu Gly Arg Met Leu Leu Thr Ser Ile Val
            100                 105                 110

Arg Gly Ile Pro Phe Trp Gly Gly Ser Thr Ile Asp Thr Glu Leu Lys
        115                 120                 125

Val Ile Asp Thr Asn Cys Ile Asn Val Ile Gln Pro Asp Gly Ser Tyr
    130                 135                 140

Arg Ser Glu Glu Leu Asn Leu Val Ile Ile Gly Pro Ser Ala Asp Ile
145                 150                 155                 160

Ile Gln Phe Glu Cys Lys Ser Phe Gly His Glu Val Leu Asn Leu Thr
                165                 170                 175

Arg Asn Gly Tyr Gly Ser Thr Gln Tyr Ile Arg Phe Ser Pro Asp Phe
            180                 185                 190

Thr Phe Gly Phe Glu Glu Ser Leu Glu Val Asp Thr Asn Pro Leu Leu
        195                 200                 205

Gly Ala Gly Lys Phe Ala Thr Asp Pro Ala Val Thr Leu Ala His Glu
    210                 215                 220

Leu Ile His Ala Gly His Arg Leu Tyr Gly Ile Ala Ile Asn Pro Asn
225                 230                 235                 240

Arg Val Phe Lys Val Asn Thr Asn Ala Tyr Tyr Glu Met Ser Gly Leu
                245                 250                 255

Glu Val Ser Phe Glu Glu Leu Arg Thr Phe Gly Gly His Asp Ala Lys
            260                 265                 270

Phe Ile Asp Ser Leu Gln Glu Asn Glu Phe Arg Leu Tyr Tyr Tyr Asn
        275                 280                 285

Lys Phe Lys Asp Ile Ala Ser Thr Leu Asn Lys Ala Lys Ser Ile Val
    290                 295                 300

Gly Thr Thr Ala Ser Leu Gln Tyr Met Lys Asn Val Phe Lys Glu Lys
305                 310                 315                 320

Tyr Leu Leu Ser Glu Asp Thr Ser Gly Lys Phe Ser Val Asp Lys Leu
                325                 330                 335

Lys Phe Asp Lys Leu Tyr Lys Met Leu Thr Glu Ile Tyr Thr Glu Asp
            340                 345                 350

Asn Phe Val Lys Phe Phe Lys Val Leu Asn Arg Lys Thr Tyr Leu Asn
        355                 360                 365

Phe Asp Lys Ala Val Phe Lys Ile Asn Ile Val Pro Lys Val Asn Tyr
    370                 375                 380

Thr Ile Tyr Asp Gly Phe Asn Leu Arg Asn Thr Asn Leu Ala Ala Asn
385                 390                 395                 400

Phe Asn Gly Gln Asn Thr Glu Ile Asn Asn Met Asn Phe Thr Lys Leu
```

```
                    405                 410                 415
Lys Asn Phe Thr Gly Leu Phe Glu Phe Tyr Lys Leu Leu Cys Val Arg
                420                 425                 430
Gly Ile Ile Thr Ser Lys Thr Lys Ser Leu Asp Lys Gly Tyr Asn Lys
                435                 440                 445
Ala Leu Asn Asp Leu Cys Ile Lys Val Asn Asn Trp Asp Leu Phe Phe
450                 455                 460
Ser Pro Ser Glu Asp Asn Phe Thr Asn Asp Leu Asn Lys Gly Glu Glu
465                 470                 475                 480
Ile Thr Ser Asp Thr Asn Ile Glu Ala Ala Glu Glu Asn Ile Ser Leu
                485                 490                 495
Asp Leu Ile Gln Gln Tyr Tyr Leu Thr Phe Asn Phe Asp Asn Glu Pro
                500                 505                 510
Glu Asn Ile Ser Ile Glu Asn Leu Ser Ser Asp Ile Ile Gly Gln Leu
                515                 520                 525
Glu Leu Met Pro Asn Ile Glu Arg Phe Pro Asn Gly Lys Lys Tyr Glu
                530                 535                 540
Leu Asp Lys Tyr Thr Met Phe His Tyr Leu Arg Ala Gln Glu Phe Glu
545                 550                 555                 560
His Gly Lys Ser Arg Ile Ala Leu Thr Asn Ser Val Asn Glu Ala Leu
                565                 570                 575
Leu Asn Pro Ser Arg Val Tyr Thr Phe Phe Ser Ser Asp Tyr Val Lys
                580                 585                 590
Lys Val Asn Lys Ala Thr Glu Ala Met Phe Leu Gly Trp Val Glu
                595                 600                 605
Gln Leu Val Tyr Asp Phe Thr Asp Glu Thr Ser Glu Val Ser Thr Thr
                610                 615                 620
Asp Lys Ile Ala Asp Ile Thr Ile Ile Pro Tyr Ile Gly Pro Ala
625                 630                 635                 640
Leu Asn Ile Gly Asn Met Leu Tyr Lys Asp Asp Phe Val Gly Ala Leu
                645                 650                 655
Ile Phe Ser Gly Ala Val Ile Leu Leu Glu Phe Ile Pro Glu Ile Ala
                660                 665                 670
Ile Pro Val Leu Gly Thr Phe Ala Leu Val Ser Tyr Ile Ala Asn Lys
                675                 680                 685
Val Leu Thr Val Gln Thr Ile Asp Asn Ala Leu Ser Lys Arg Asn Glu
                690                 695                 700
Lys Trp Asp Glu Val Tyr Lys Tyr Ile Val Thr Asn Trp Leu Ala Lys
705                 710                 715                 720
Val Asn Thr Gln Ile Asp Leu Ile Arg Lys Lys Met Lys Glu Ala Leu
                725                 730                 735
Glu Asn Gln Ala Glu Ala Thr Lys Ala Ile Ile Asn Tyr Gln Tyr Asn
                740                 745                 750
Gln Tyr Thr Glu Glu Lys Asn Asn Ile Asn Phe Asn Ile Asp Asp
                755                 760                 765
Leu Ser Ser Lys Leu Asn Glu Ser Ile Asn Lys Ala Met Ile Asn Ile
                770                 775                 780
Asn Lys Phe Leu Asn Gln Cys Ser Val Ser Tyr Leu Met Asn Ser Met
785                 790                 795                 800
Ile Pro Tyr Gly Val Lys Arg Leu Glu Asp Phe Asp Ala Ser Leu Lys
                805                 810                 815
Asp Ala Leu Leu Lys Tyr Ile Tyr Asp Asn Arg Gly Thr Leu Ile Gly
                820                 825                 830
```

-continued

```
Gln Val Asp Arg Leu Lys Asp Lys Val Asn Asn Thr Leu Ser Thr Asp
        835                 840                 845
Ile Pro Phe Gln Leu Ser Lys Tyr Val Asp Asn Gln Arg Leu Leu Ser
850                 855                 860
Thr Phe Thr Glu Tyr Ile Lys Asn Ile Asn Thr Ser Ile Leu Asn
865                 870                 875                 880
Leu Arg Tyr Glu Ser Asn His Leu Ile Asp Leu Ser Arg Tyr Ala Ser
                885                 890                 895
Lys Ile Asn Ile Gly Ser Lys Val Asn Phe Asp Pro Ile Asp Lys Asn
                900                 905                 910
Gln Ile Gln Leu Phe Asn Leu Glu Ser Ser Lys Ile Glu Val Ile Leu
                915                 920                 925
Lys Asn Ala Ile Val Tyr Asn Ser Met Tyr Glu Asn Phe Ser Thr Ser
930                 935                 940
Phe Trp Ile Arg Ile Pro Lys Tyr Phe Asn Ser Ile Ser Leu Asn Asn
945                 950                 955                 960
Glu Tyr Thr Ile Ile Asn Cys Met Glu Asn Asn Ser Gly Trp Lys Val
                965                 970                 975
Ser Leu Asn Tyr Gly Glu Ile Ile Trp Thr Leu Gln Asp Thr Gln Glu
                980                 985                 990
Ile Lys Gln Arg Val Val Phe Lys Tyr Ser Gln Met Ile Asn Ile Ser
                995                 1000                1005
Asp Tyr Ile Asn Arg Trp Ile Phe Val Thr Ile Thr Asn Asn Arg
        1010                1015                1020
Leu Asn Asn Ser Lys Ile Tyr Ile Asn Gly Arg Leu Ile Asp Gln
        1025                1030                1035
Lys Pro Ile Ser Asn Leu Gly Asn Ile His Ala Ser Asn Asn Ile
        1040                1045                1050
Met Phe Lys Leu Asp Gly Cys Arg Asp Thr His Arg Tyr Ile Trp
        1055                1060                1065
Ile Lys Tyr Phe Asn Leu Phe Asp Lys Glu Leu Asn Glu Lys Glu
        1070                1075                1080
Ile Lys Asp Leu Tyr Asp Asn Gln Ser Asn Ser Gly Ile Leu Lys
        1085                1090                1095
Asp Phe Trp Gly Asp Tyr Leu Gln Tyr Asp Lys Pro Tyr Tyr Met
        1100                1105                1110
Leu Asn Leu Tyr Asp Pro Asn Lys Tyr Val Asp Val Asn Asn Val
        1115                1120                1125
Gly Ile Arg Gly Tyr Met Tyr Leu Lys Gly Pro Arg Gly Ser Val
        1130                1135                1140
Met Thr Thr Asn Ile Tyr Leu Asn Ser Ser Leu Tyr Arg Gly Thr
        1145                1150                1155
Lys Phe Ile Ile Lys Lys Tyr Ala Ser Gly Asn Lys Asp Asn Ile
        1160                1165                1170
Val Arg Asn Asn Asp Arg Val Tyr Ile Asn Val Val Val Lys Asn
        1175                1180                1185
Lys Glu Tyr Arg Leu Ala Thr Asn Ala Ser Gln Ala Gly Val Glu
        1190                1195                1200
Lys Ile Leu Ser Ala Leu Glu Ile Pro Asp Val Gly Asn Leu Ser
        1205                1210                1215
Gln Val Val Val Met Lys Ser Lys Asn Asp Gln Gly Ile Thr Asn
        1220                1225                1230
```

-continued

```
Lys Cys Lys Met Asn Leu Gln Asp Asn Asn Gly Asn Asp Ile Gly
    1235                1240                1245

Phe Ile Gly Phe His Gln Phe Asn Asn Ile Ala Lys Leu Val Ala
    1250                1255                1260

Ser Asn Trp Tyr Asn Arg Gln Ile Glu Arg Ser Ser Arg Thr Leu
    1265                1270                1275

Gly Cys Ser Trp Glu Phe Ile Pro Val Asp Asp Gly Trp Gly Glu
    1280                1285                1290

Arg Pro Leu
    1295
```